United States Patent
Guirado

(10) Patent No.: US 10,726,607 B1
(45) Date of Patent: Jul. 28, 2020

(54) DATA PROCESSING SYSTEMS

(71) Applicant: Arm Limited, Cambridge (GB)

(72) Inventor: Antonio Garcia Guirado, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/508,077

(22) Filed: Jul. 10, 2019

(51) Int. Cl.
| | |
|---|---|
| G06T 15/04 | (2011.01) |
| G06T 15/00 | (2011.01) |
| G06F 9/38 | (2018.01) |
| G06F 9/30 | (2018.01) |
| G06F 12/0802 | (2016.01) |

(52) U.S. Cl.
CPC .......... G06T 15/04 (2013.01); G06F 9/30029 (2013.01); G06F 9/3877 (2013.01); G06F 12/0802 (2013.01); G06T 15/005 (2013.01)

(58) Field of Classification Search
CPC ... G06T 15/005; G06T 15/04; G06F 9/30029; G06F 9/3877; G06F 12/0802
See application file for complete search history.

(56) References Cited

U.S. PATENT DOCUMENTS

| | | | |
|---|---|---|---|
| 10,657,699 B1 * | 5/2020 | Giliberto | ................. G06T 15/04 |
| 2015/0130819 A1 * | 5/2015 | Peng | ..................... G06T 11/001 |
| | | | 345/501 |

* cited by examiner

*Primary Examiner* — Ke Xiao
*Assistant Examiner* — Jed-Justin Imperial
(74) *Attorney, Agent, or Firm* — Vierra Magen Marcus LLP

(57) ABSTRACT

To determine whether a first n-bit binary data value and a second n-bit binary data value in a data processing system, such as texel position coordinates in a graphics processing system, are the same or differ from each other by exactly one, it is determined whether the first and second data values excluding the least significant bits of the data values are the same as each other, and the least significant bits of the data values are compared. A mask value that is generated for each data value using an XOR operation and a thermometer scanning operation is used to generate an output value for the two data values, based on whether the mask values for a bit position for the first and second data values are both set or not, and a comparison of the bit values of the first and second data values for that bit position.

22 Claims, 7 Drawing Sheets

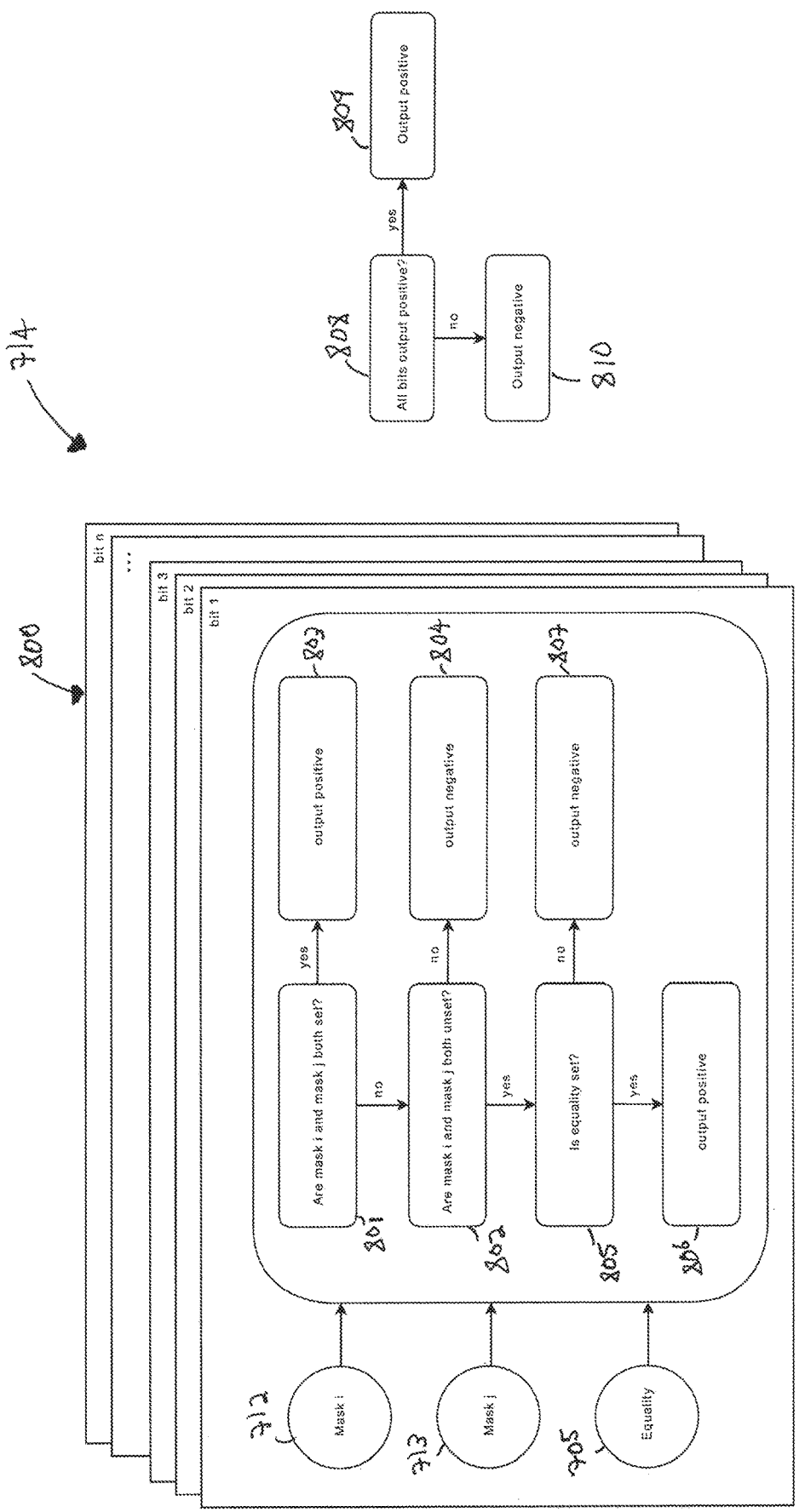

DATA PROCESSING SYSTEMS

BACKGROUND

The technology described herein relates to data processing systems, and in particular to methods of and apparatus for detecting when two numbers representing data values in a data processing system are equal to each other or differ from each other by only one.

The Applicants have recognised that it can be useful in data processing systems to be able to determine whether two binary numbers representing particular data values in the data processing system are equal to each other or only differ from each other by one. For example, this may be, as will be discussed further below, particularly useful in the case of fetching texel (texture data element) values for use in texture mapping in graphics processing systems and graphics processors.

Texture mapping is a technique that is used in graphics processing systems for generating colours for sampling positions in a render output (e.g., image to be displayed). In texture mapping, so-called textures or texture data are applied to the surfaces to be drawn. The textures are typically applied by storing an array of texture elements ("texels"), each representing given texture data (such as colour, luminance, and/or light/shadow, etc. values), and then mapping the texels on to the corresponding elements, such as (and, indeed, typically) a set of sampling positions, for the render output in question (e.g. image to be displayed).

Thus a graphics texture will typically be configured as an array of data elements (texture elements (texels)), each having a corresponding set of texture data stored for it. The texture data for a given position within the texture is then determined by sampling the texture at that position (e.g. using a bilinear interpolation process).

To perform this texture sampling (e.g. bilinear interpolation), the texels (the data values of the texels) surrounding the position within the texture for which the texture value is required will be fetched from the storage (memory) where the graphics texture is stored, into a cache associated with the texture mapping process, with the texel values then being fetched from the cache and subjected to the appropriate, e.g. bilinear, interpolation process, to derive the texture data value to be applied to the surface to be drawn. Thus, as part of the texture mapping process, respective sets of texels will be fetched from memory into a cache, from where the texel values will then be fetched for the texture mapping process.

The texture (texel) cache of a graphics processor will typically include a plurality of cache lines, each able to store a plurality of individual texels. A given cache line may store spatially adjacent texels from the texture (such as texels from the same row in the texture, and/or from two or more adjacent rows in the texture).

In a graphics processing system, the texel fetching process may be able to fetch plural texels per cycle into and from the texture cache, but may be also be constrained by a limit on the maximum number of different cache lines that can be looked-up in a given cycle. In order to maximise throughput of the texture mapping process, it would be desirable to be able to fetch as many texels in as many cache lines as possible in a given cycle.

The Applicants have recognised that in order to increase the throughput of the texel fetching process, it would be desirable to be able to identify those texels that are to be fetched that fall within the same cache line (as then those texels can be fetched from/into that same cache line in the same cycle). This will then facilitate increasing (and maximising) the number of texels that can be fetched in a single cycle.

In graphics texture mapping, texels may be fetched, for example, as respective groups of 2×2 texels (so as to be suitable for bilinearly interpolating to provide texture data value for given positions in the texture). Thus in a given fetching cycle, a plurality of such 2×2 texel groups may be desired to be fetched. Such texel groups may overlap with each other, depending upon the positions of the respective texels within each group. If texels within different texel groups to be fetched overlap with each other, then those texels may belong to (be stored in) the same cache line in the texel cache. Thus, if it is possible to identify whether there is any overlap between texels in respective 2×2 texel groups that are to be fetched in a given fetch cycle, that can be used to identify those texels within the texel groups to be fetched that will belong to the same cache line, thereby allowing the number of texels to be fetched in a given fetch cycle to be optimised (by fetching texels for different texel groups that will reside in the same cache lines in the texel cache).

The Applicants have further recognised that in such arrangements, two 2×2 texel groups will overlap, at least in part (such that at least some texels from the different 2×2 groups may belong to the same cache line), if the respective positions (coordinates) of the texel groups in the texture are the same as each other or only differ from each other by exactly one. For example, if the top-left texels of each 2×2 group have the same position in the texture (the same coordinates in the texture) then the two 2×2 texel groups overlap completely. If one of the coordinates (e.g. the x coordinate) of the top-left texel of one of the 2×2 texel groups is one less than that coordinate for the other 2×2 texel group, and the other coordinates (e.g. the y coordinates) are equal, then two of the texels in each group will overlap with each other (and so on, as will be discussed in more detail below).

Thus the Applicants have recognised that one way to determine whether texels to be fetched for a texture mapping process share the same cache line in the texture cache is to compare the positions (coordinates) of texels to be fetched, and to determine whether those coordinates are the same as each other or differ from each other by exactly one (by only one).

BRIEF DESCRIPTION OF THE DRAWINGS

Embodiments of the technology described herein will now be described by way of example only and with reference to the accompanying drawings, in which:

FIG. 7 shows a part of the determining whether position coordinate values are equal or differ from each other by exactly one in an embodiment of the technology described herein.

Like numerals are used for like features in the drawings where appropriate.

DETAILED DESCRIPTION

Figure 1:
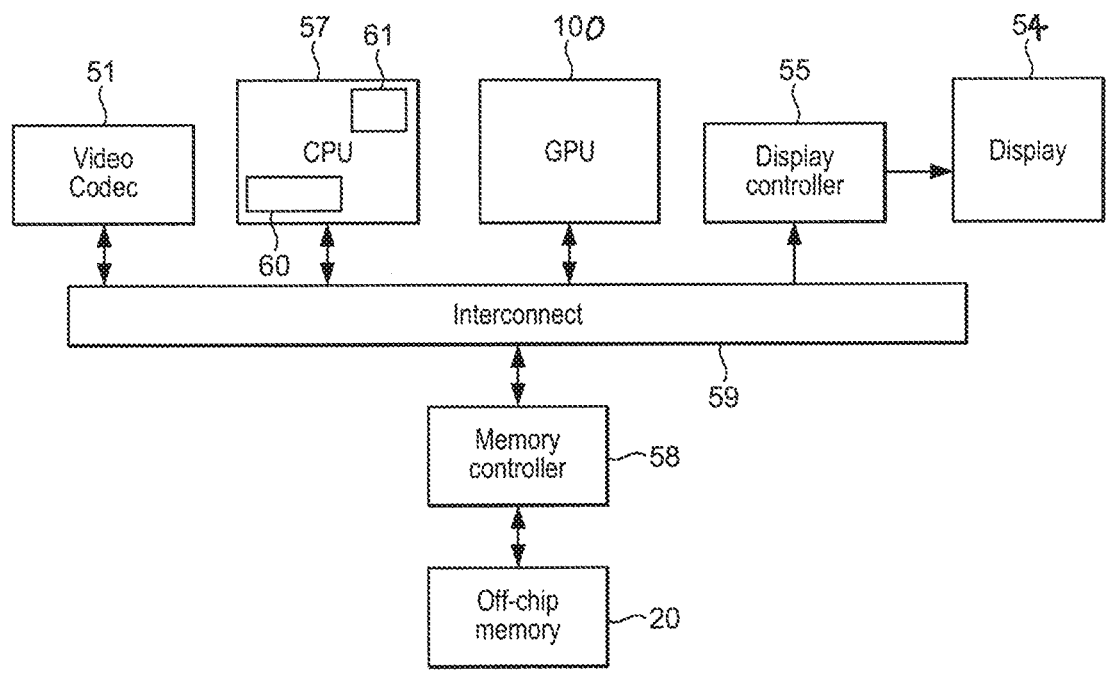
FIG. 1 shows an exemplary data processing system in which the technology described herein may be implemented.

Thus, a first embodiment of the technology described herein comprises a method of operating a graphics processing system in which graphics textures may be used when rendering a render output and in which groups of texels of a texture to be used when rendering a render output are fetched for use by the graphics processing system when rendering the render output;

the method comprising, when there are plural groups of texels to be fetched when rendering a render output, each group of texels having an associated set of position coordinates representative of the position of the group of texels in the texture, each position coordinate being represented by an n-bit binary number:

determining for one or more pairs of groups of texels of the groups of texels to be fetched, whether the groups of texels of the pair overlap with each other in the texture at all;

selecting texels of the groups of texels to fetch in a fetch cycle based on the overlap determination; and fetching the selected texels of the groups of texels in a fetch cycle;

wherein determining whether the groups of texels of a pair of groups of texels overlap with each other in the texture at all comprises:

determining for the pair of groups of texels, whether a position coordinate for a first texel group of the pair and the corresponding position coordinate for the second texel group of the pair are the same as each other or differ from each other by exactly one by:

determining whether the position coordinates for the first and second texel groups excluding the least significant bits of the position coordinates are the same as each other;

comparing the least significant bit of the position coordinate for the first texel group to the least significant bit of the position coordinate for the second texel group to determine whether: the least significant bits of the position coordinates for the first and second texel groups are the same as each other; the least significant bit of the position coordinate for the first texel group is greater than the least significant bit of the position coordinate for the second texel group; or the least significant bit of the position coordinate for the first texel group is less than the least significant bit of the position coordinate for the second texel group;

for each of the position coordinates for the first and second texel groups:

performing an XOR operation with the least significant bit of the coordinate at least for all of the bits except the least significant bit in the coordinate to provide an XOR-modified coordinate value; and generating a mask value from each XOR-modified coordinate value by scanning each XOR-modified coordinate value from its least significant bit to its most significant bit, and setting the corresponding bit in the mask for each bit in the XOR-modified coordinate value from the least significant bit to the most significant bit up to and including the first bit in the XOR-modified coordinate value that has a value of one;

for each bit position except the least significant bit of the position coordinates, using the corresponding mask values for the first and second texel group position coordinates for that bit position to set an output bit for that bit position in an (n−1)-bit output value for the pair of texel groups, comprising:

when the mask values for the bit position for the first and second texel group position coordinates are both set, setting the output bit for that bit position in the output value;

when only one of the mask values for the bit position for the first and second texel group position coordinates is set, not setting the output bit for that bit position in the output value; and when the mask values for the bit position for the first and second texel group position coordinates are both not set, also using a comparison of the bit values of the position coordinates for the first and second texel groups for that bit position, and when the bit values for that bit position in the position coordinates for the first and second texel groups are the same, setting the output bit for that bit position in the output value, but when the position coordinate values for the bit position are different, not setting the output bit for that bit position in the output value;

determining whether all the bits in the output value for the pair of texel groups have been set or not;

using:

the result of the determination of whether the position coordinates for the first and second texel groups excluding the least significant bits of the position coordinates are the same as each other;

the comparison of the least significant bit of the position coordinate for the first texel group to the least significant bit of the position coordinate of the second texel group; and the determination of whether all the bits in the output value generated using the mask values for the pair of texel groups have been set or not:

to determine whether the position coordinate for the first texel group of the pair of texel groups and the corresponding position coordinate for the second texel group of the pair of texel groups are the same as each other or differ from each other by exactly one;

and determining whether the first texel group of the pair and the second texel group of the pair overlap with each other in the texture at all using the determination of whether the position coordinate for the first texel group of the pair and the corresponding position coordinate for the second texel group of the pair are the same as each other or differ from each other by exactly one.

A second embodiment of the technology described herein comprises a graphics processor, the graphics processor comprising:

a texture mapper operable to perform graphics texture mapping operations;

a texel cache operable to store texels to be used for graphics texture mapping operations; and a texel fetching circuit operable to fetch texels of a texture for use by the texture mapper to perform graphics texturing operations;

the graphics processor further comprising:

a texel group overlap determining circuit configured to, when there are plural groups of texels to be fetched for use by the texture mapper to perform graphics texturing operations, each group of texels having an associated set of position coordinates representative of the position of the group of texels in the texture, each position coordinate being represented by an n-bit binary number:

determine for one or more pairs of groups of texels of the groups of texels to be fetched, whether the groups of texels of the pair overlap with each other in the texture at all; and a texel selecting circuit configured to select texels of groups of texels to fetch in a fetch cycle based on the overlap determination, and to cause the texel fetching circuit to fetch the selected texels of the groups of texels in a fetch cycle;

wherein the texel group overlap determining circuit comprises a texel group position coordinate comparing circuit, configured to determine for a pair of groups of texels, whether a position coordinate for a first texel group of the pair and the corresponding position coordinate for the second texel group of the pair are the same as each other or differ from each other by exactly one, the texel group position coordinate comparing circuit comprising:

a coordinate comparing circuit configured to determine whether the position coordinates for the first and second texel groups excluding the least significant bits of the position coordinates are the same as each other and to provide an output indicating whether the position coordinates for the first and second texel groups excluding the least significant bits of the position coordinates are the same as each other;

a least significant bit comparison circuit configured to compare the least significant bit of the position coordinate for the first texel group to the least significant bit of the position coordinate for the second texel group and to provide an output indicating whether: the least significant bits of the position coordinates for the first and second texel groups are the same as each other; the least significant bit of the position coordinate for the first texel group is greater than the least significant bit of the position coordinate for the second texel group; or the least significant bit of the position coordinate for the first texel group is less than the least significant bit of the position coordinate for the second texel group;

a mask value generating circuit configured to, for each of the position coordinates for the first and second texel groups:

perform an XOR operation with the least significant bit of the coordinate at least for all of the bits except the least significant bit in the coordinate to provide an output XOR-modified coordinate value; and generate as an output from each XOR-modified coordinate value a mask value by scanning each XOR-modified coordinate value from its least significant bit to its most significant bit, and setting the corresponding bit in the mask for each bit in the XOR-modified coordinate value from the least significant bit to the most significant bit up to and including the first bit in the XOR-modified coordinate value that has a value of one;

an output value generating circuit, configured to generate an (n−1)-bit output value for the pair of texel groups using the mask values generated by the mask value generating circuit by, for each bit position except the least significant bit of the position coordinates, using the corresponding mask values for the first and second texel group position coordinates for the bit position to determine whether to set an output bit for that bit position in an (n−1)-bit output value for the pair of texel groups, by:

when the mask values for the bit position for the first and second texel group position coordinates are both set, setting the output bit for that bit position in the output value;

when only one of the mask values for the bit position for the first and second texel group position coordinates is set, not setting the output bit for that bit position in the output value; and when the mask values for the bit position for the first and second texel group position coordinates are both not set, also using a comparison of the bit values of the position coordinates for the first and second texel groups for that bit position, and when the bit values for that bit position in the position coordinates for the first and second texel groups are the same, setting the output bit for that bit position in the output value, but when the position coordinate values for the bit position are different, not setting the output bit for that bit position in the output value;

an output value assessment circuit configured to provide an output indicating whether all the bits in the output value generated for the pair of texel groups have been set or not;

and a position coordinate overlap determining circuit configured to use the output of the coordinate comparing circuit, the output of the least significant bit comparison circuit, and the output of the output value assessment circuit:

to determine whether the position coordinate for the first texel group of the pair of texel groups and the corresponding position coordinate for the second texel group of the pair of texel groups are the same as each other or differ from each other by exactly one, and to provide an output indicating whether the position coordinate for the first texel group of the pair of texel groups and the corresponding position coordinate for the second texel group of the pair of texel groups are the same as each other or differ from each other by exactly one;

and wherein the texel group overlap determining circuit is configured to determine whether the first texel group of the pair and the second texel group of the pair overlap with each other in the texture at all using the output of the position coordinate overlap determining circuit.

The technology described herein in these embodiments is directed to a method of and apparatus for selecting texels of groups of texels to be fetched for a graphics processing texture mapping process.

In these embodiments of the technology described herein, the texels to be fetched in a given cycle are selected by determining whether texel groups to be fetched overlap at all. Moreover, this is done by determining whether position coordinates for texel groups to be fetched are equal to each other or only differ from each other by one. As will be discussed further below, this can in particular identify texel groups that overlap in the texture and thus whose texels will reside in the same cache lines in the texel cache, and so therefore can be fetched in the same fetch cycle. This can lead to more efficient fetching of texels, thereby increasing the throughput of the texture mapping process.

Moreover, the technology described herein uses a particular process and circuit for determining whether the position coordinates of texel groups are the same as each other or differ from each other by only one. As will be discussed further below, the Applicants have recognised that this particular arrangement for identifying whether the position coordinates are the same as each other or only differ from each other by one can detect when the position coordinates are the same or only differ from each other by one in a particularly efficient and effective manner.

In particular, the Applicants have recognised that this arrangement for detecting whether the position coordinates are the same or only differ from each other by one can be implemented in hardware in a relatively straightforward and efficient manner, i.e. using a relatively small amount of processing logic (i.e. chip area), and in a manner that can be significantly more efficient, e.g. in terms of lower chip area and/or the amount of processing required, and therefore the power consumption, than other techniques.

Accordingly, the technology described herein can be used to increase the throughput when fetching texels in a graphics processing system, whilst using only a relatively small amount of processing circuitry (chip area), thereby resulting in a significant saving in chip area and/or power consumption compared to other techniques.

The technology described herein in these embodiments relates in particular to the situation where there are plural groups of texels to be fetched. These texel groups will be required, for example, and in an embodiment, for texture mapping operations that are to be performed by the graphics processing system, such as, and in an embodiment, a texture filtering operation, such as a bilinear filtering operation, which is to be performed using the fetched texel groups to provide a texture filtering operation output result (such as a sampled texture value), e.g., and in an embodiment, for returning to a rendering (fragment shading) process of the graphics processing system.

The texture mapping operations are in an embodiment performed by an appropriate texture mapper (texture mapping apparatus). This texture mapper (texture mapping apparatus) can be configured as desired, but in an embodiment includes the texel cache, and at least a texel fetching circuit operable to fetch texels for a texture mapping operation. The texture mapper (apparatus)/process in an embodiment also includes a texture filtering circuit/process operable to perform a texture filtering operation using groups of texels (texture data element values) to provide a texture filtering operation output result.

The texture mapping operations themselves (and the fetching of the texel groups) may be triggered in any suitable and desired manner. For example, and in an embodiment, the texture mapping process (apparatus) may receive a request for a texture mapping operation, e.g. from a renderer (e.g. fragment shader) of a graphics processor, and, in response to such a request from the renderer, perform the desired texture mapping operation (including fetching the required texel groups).

The textures that are used in these embodiments of the technology described herein will comprise appropriate (e.g. 2D) arrays of texture data elements (texels), each having an associated data (e.g. colour) value. Each texture data element will have a corresponding position denoted by appropriate position coordinates (e.g. (x, y), or (u, v) or (s, t), etc.), in the texture that it belongs to.

The textures will be, and are in an embodiment, stored in a (main) memory (memory system) of the overall data/ graphics processing system that the, e.g., graphics processor, is part of. This memory system may comprise any suitable and desired memory and memory system of the overall data/graphics processing system, such as a main memory for the graphics processing system (e.g. where there is a separate memory system for the graphics processor), or a main memory of the data processing system which is shared with other elements, such as a host processor (CPU), of the data processing system. Other arrangements would, of course, be possible.

The texture mapper and texture mapping process has an associated texel cache that stores texel groups locally to the texture mapper for use. The texel cache could be a single cache or comprise a set of plural caches as desired. Where plural texel caches are used, the operation in the manner of the technology described herein can be, and is in an embodiment, used appropriately for (and within) each "individual" cache, and/or for the set of plural caches as a whole.

The (and each) texel cache in an embodiment comprises a plurality of cache lines, each operable to store texture data, and having an associated identifier (a "tag") that can be used to identify the texture data (texels) stored in the cache line (i.e. that can be used as a "lookup" key to read texture data from the cache).

In an embodiment, the texture data stored in the texel cache is identified (tagged) using an identifier that is indicative of a position in the graphics texture that the cached texture data (texels) comes from (relates to). In an embodiment each cache line of texture data is identified (is tagged) using a position in the texture that the texture data (texels) that is stored in the cache line comes from (relates to).

The position in a texture that a cache line is tagged with could, e.g., comprise the actual position of a texel whose data is stored in the cache line (e.g. of the first texel that is stored in the cache line), but need not be the position of a particular texel, but could, for example, be otherwise indicative of a region within the texture that the data in the cache line relates to. A single position identifier (tag) could be used for a given cache line, or the cache line could be associated with (tagged with) a range of positions (indicating a range of texture positions that the data in the cache line relates to).

For example, the overall texture could be considered to be divided into respective regions (e.g. having the same size and shape (configuration), e.g. with each region corresponding to a given block of texels that will fill a cache line), with the position identifier (tag) used for a given cache line then indicating a suitable index position (coordinate) for the texture region within the texture that the data in the cache line corresponds to.

In an embodiment, the position identifier (tag) used for a cache line is a lower-precision representation (set of coordinates) of the position of a, and in an embodiment of the first, texel that is stored in the cache line.

Each cache line in the texel cache can in an embodiment store (and stores) a plurality of individual (discrete and separate) texture data values (stores a plurality of texels), as respective individual (discrete) entries (data units) in the cache line. For example, each cache line may be able to store up to sixteen texels.

The texture data is in an embodiment stored in this cache as respective "texels" (texture data elements) (irrespective of the form in which the data may be stored in the main memory system). Thus, each cache line will be able to store a plurality of texels (the data values for a plurality of texels). In an embodiment, each cache line stores (and the texels are loaded into the cache such that each cache line of the cache stores) a set of contiguous texels of a texture (i.e. represents a set of adjacent (or successive) texture data element positions of the texture in question). Correspondingly, each cache line in an embodiment stores texels from a particular, single texture only.

Thus, the texels stored in a cache line of this cache in an embodiment comprise a set of texels that cover a particular region (area) of the texture in question, such as a row or column of texels or a block (e.g. a square or rectangle) of contiguous texels.

These embodiments of the technology described herein relate in particular to the situation where there are plural groups of texels to be fetched for texture mapping operations, and the selection of which texels of the texel groups that are waiting to be fetched to fetch in a given fetch cycle. The plural groups of texels that are waiting to be fetched will comprise groups of texels that are required for pending (waiting) texture mapping operations. The texture mapping apparatus and process may, accordingly, include a record (e.g. a "parking" buffer) of those texture mapping operations that are awaiting texel groups to be fetched to be performed, if desired.

The texel groups that are considered in these embodiments of the technology described herein could comprise only a single texel each, but in an embodiment each comprise plural texels, and in an embodiment each comprise a 2×2 group of neighbouring texels. (Thus a (and each) texel group in an embodiment comprises a "quad" of four (2×2) adjacent texels, that may e.g., and in an embodiment, be subjected to a bilinear filtering operation to provide a sampled texture value.)

The texels of the texel groups to fetch in a fetch cycle are selected based on determining whether any of the texel groups waiting to be fetched overlap, at least in part, with each other. As will be discussed further below, if it can be determined that texel groups overlap in the texture at all, then that will mean that overlapping texels of the groups will belong to the same cache line in the texel cache (such that they can be fetched together in the same fetch cycle). Thus, by determining whether texel groups to be fetched overlap or not, the texel fetching process can be made more efficient.

In particular, the texel fetching process in an embodiment operates to select overlapping texels of texel groups to fetch in a fetch cycle (where possible), as that will then help to maximise the number of texels that can be fetched in a given fetch cycle. Thus the selecting of the texels of the groups of texels to fetch in a fetch cycle based on the overlap determination in an embodiment operates to preferentially select for fetching in the same fetch cycle texels from groups of texels that have been determined to overlap with each other (at least in part).

The operation in the manner of the technology described herein could operate to identify and select the texels to fetch in the next (or some future) fetch cycle based on the overlap determination, but in an embodiment the overlap determination and consequent texel selection and fetching is all done in (is all part of) the same cycle.

The overlap determination, texel selection and fetching process is correspondingly in an embodiment repeated for plural successive (and in an embodiment for each successive) fetch cycle where there are texel groups waiting to be fetched, so as to control and select the texels of the texel groups that are fetched in each fetch cycle of a sequence of fetch cycles.

For a given fetch cycle, there will typically, and in an embodiment, be a set of plural texel groups waiting to be fetched, and these embodiments of the technology described herein will operate to select some or all of the texels of those texel groups to be fetched in a fetch cycle. Depending on the number of texel groups waiting in the set, and their layout within the texture, it may be that all of the texels of the waiting texel groups will be able to be fetched in the fetch cycle (e.g. where they include no more than the maximum number of texels that can be fetched in a single fetch cycle and reside in no more than the maximum number of cache lines that can be looked-up (fetched) in a single fetch cycle), but more typically, the process will operate to select texels from a subset of the waiting groups of texels to be fetched in a fetch cycle. Thus, in an embodiment, there will be a set of plural texel groups to be fetched, and the operation in the manner of the technology described herein will be operable to select texels of a subset of some but not all of those texel groups to be fetched in a fetch cycle, based on the determination of whether any of the texel groups waiting to be fetched overlap with each other (at least in part).

Correspondingly, depending on the distribution of the texels of a given texel group in the cache (and within the texture), it may be that all of the texels of a waiting texel group will be able to be fetched in the fetch cycle (e.g. where the texels of the group comprise no more than the maximum number of texels that can be fetched in a single fetch cycle and reside in no more than the maximum number of cache lines that can be looked-up (fetched) in a single fetch cycle), but equally the process may operate to select and fetch in a fetch cycle only some of the texels of a waiting group of texels to be fetched (e.g. where the texel group spans plural cache lines). Thus, in an embodiment, there will be a set of plural texel groups to be fetched, and the operation in the manner of the technology described herein will be operable to select (and fetch) some but not all of the texels of one or more (e.g. of some but not all) of those texel groups to be fetched in a fetch cycle, based on the determination of whether any of the texel groups waiting to be fetched overlap with each other (at least in part). In an embodiment, where only some but not all of the texels of a texel group may be fetched in a fetch cycle, the process operates to keep track of the texels that have been fetched for a (and each) texel group, so as to identify when all the texels for a texel group have been fetched (and then, e.g., remove completed texel groups from the set of waiting texel groups).

As well as selecting the texels to be fetched in a fetch cycle based on the determination of whether any of the texel groups to be fetched overlap with each other (at least in part), the texel group selection in an embodiment also takes account of any constraints and limitations on the number of texels that can be fetched in a given cycle, and on the number of different cache lines that can be looked-up (fetched) in a given cycle. In an embodiment the texel selection is made based on the overlap determination, so as to maximise the number of texels that will be fetched in the fetch cycle, subject to any constraints on the number of different cache lines that can be looked-up in the cycle. Thus, for example, and in an embodiment, the overlap determination is used to identify texels of texel groups that belong to (that share) the same cache line, and to preferentially fetch cache lines that will include more texels of the texel groups waiting to be fetched (so as to increase, and in an embodiment maximise, the number of texels that can and will be fetched in the fetch cycle).

In an embodiment, particularly in the case where more than two groups of texels are waiting to be fetched and are being considered to determine if they overlap (as will be discussed in more detail below), a first texel group is selected and then it is determined whether any of the other texel groups overlap with that first texel group, at least in part, to then select which texels of the first texel group and of any overlapping texel groups are fetched in the fetch cycle. In the case where the overlap determination (effectively) considers which cache lines the texels of the texel groups reside in (as will be discussed further below), in an embodiment a cache line or lines used by a first texel group are determined, and then any other texel groups that include texels in the cache line or lines used by the first texel group are identified using the overlap determination, and then all of the texels in the texel groups that use the determined cache line or lines are fetched in the fetch cycle.

Thus, in an embodiment, the selecting of texels of the groups of texels to fetch in a fetch cycle based on the overlap determination comprises determining whether any of the groups of texels overlap with a (first) texel group of the groups of texels, and then selecting texels of the first texel group and of texel groups determined to overlap with that first texel group for fetching in the fetch cycle. In an embodiment this comprises determining a cache line or lines that will be used for texels of the (first) texel group, and then determining whether any other texel groups include texels that will use the cache line or lines used by the first texel group using the overlap determination, and then fetching all of the texels in the texel groups that use the cache line or lines.

Other arrangements would, of course, be possible.

Once the texels (e.g. cache lines) to fetch in a fetch cycle have been determined, then the process, e.g. texture mapper, should, and in an embodiment does, operate to fetch those selected texels in the fetch cycle in question. The texels can be fetched in any suitable and desired manner, such as, and in an embodiment, in accordance with the normal fetching process for the data/graphics processing system in question.

Once the selected texels have been fetched, they can be used in the desired texture mapping process, in any suitable and desired manner.

For example, each group of texels may be subjected to a texture filtering operation, such as bilinear, trilinear or anisotropic filtering to provide a filtered (sampled) texture value for use in a rendering operation (e.g. to shade a sampling position in a surface (e.g. image) being rendered). At least in the case where each texel group comprises a 2×2 block of texels, the groups of texels are in an embodiment (each) subjected to a bilinear filtering operation to provide a filtered (sampled) texture value for use.

The texture mapping process may then return the texture filtering operation output result to the processor (process) (e.g. renderer/fragment shader) that requested the texture mapping operation, for use (e.g. for applying as a texture to a sampling position or positions being rendered).

This will then be repeated for the next cycle, and so on.

In these embodiments of the technology described herein, it is determined whether one or more pairs of groups of texels of the groups of texels to be fetched overlap with each other in the texture at all (to select which texels of the groups of texels to fetch in a fetch cycle). The process could consider only a single pair of the groups of texels waiting to be fetched, but as will be discussed further below, in an embodiment it is considered and determined for each of plural pairs of groups of texels of the groups of texels to be fetched, whether the groups of texels of the pair overlap with each other in the texture at all.

Whether a pair of texel groups to be fetched into the texel cache overlap with each other at all is determined by determining whether position coordinates for the texel groups of the pair are the same as each other or differ from each by exactly one.

The position coordinates for the texel groups that are considered in this regard can be any suitable and desired position coordinates that represent and indicate the position of the texel group within the texture in question.

In an embodiment, the position coordinates that are considered for the texel groups comprise position coordinates representative of the position of a texel of the texel group (and for the corresponding texel in each texel group that is being considered). Thus, in the case of 2×2 texel groups, the position coordinates that will be considered to determine whether they are same as each other or differ from each other by exactly one are in an embodiment position coordinates that are representative of the position of one of the (and the corresponding) texels in each texel group, such as, and in an embodiment the positions of the top-left texels in each texel group. (Other arrangements would, of course, be possible.)

The position coordinates that are representative of the position of, e.g. a texel (e.g. the top-left texel) of, each texel group could be the actual position coordinates for the texel group (for the texel in question) in the texture. In an embodiment, the position coordinates that are used for the overlap determination are coordinates that are a lower precision representation of the position of the texel group (e.g. of a particular texel, such as the top-left texel of the texel group) in the texture. In an embodiment the position coordinates that are considered and compared for the overlap determination are the position coordinates of the cache line that the texel group (or the particular texel in the texel group) belongs to, i.e. the position coordinates that the cache line that the texel group (or the particular texel in the texel group, such as the top-left texel) belongs to (and will be stored in) is tagged by.

Each position coordinate for a texel group will be an n-bit binary number, and each texel group (e.g. the top-left texel of the group) will have a pair of (n-bit) position coordinates associated with it, representing the position of that texel group (e.g. texel) in the texture. The determination of whether the position coordinates for different texel groups are the same as each other or differ from each other by exactly one is in an embodiment performed for each respective position coordinate that defines the position of the texel group (e.g. of the relevant texel in the texel group).

Thus, in the case where a position for each texel group in the texture is represented by a pair of position coordinates (x, y) (or (u, v) or (s, t), etc.), it will be determined for the pair of groups of texels being considered whether the first (e.g. x) position coordinate for the first texel group of the pair and the corresponding, first (e.g. x) position coordinate for the second texel group of the pair are the same as each other or differ from each other by exactly one, and, separately, determined whether the other (second) position coordinate (e.g. the y coordinate) for the first texel group of the pair and the corresponding other (second) position (e.g. y) coordinate for the second texel group of the pair are the same as each other or differ from each other by exactly one.

Thus, in an embodiment, it is determined (in the manner of the technology described herein) separately for each respective position coordinate for the pair of groups of texels, whether that position coordinate for the first texel group of the pair and the corresponding position coordinate for the second texel group of the pair are the same as each other or differ from each other by exactly one.

Correspondingly, the results of the respective position coordinate determinations are, in an embodiment, then used together to determine whether the first and second texel groups overlap each other at all.

Thus, it will be determined in the manner of the technology described herein whether the x (e.g.) position coordinate first texel group of the pair and for the second texel group of the pair are the same as each other or differ from each other by exactly one, and it will also be determined whether the y (e.g.) coordinate for the first texel group of the pair and for the second texel group of the pair are the same as each other or differ from each other by exactly one, and then the results of that determination for both the x and y coordinates for the texel groups will then be used to determine whether the first texel group of the pair and the second texel group of the pair overlap with each other in the texture at all.

The technology described herein uses a number of different comparisons and operations on the respective position coordinates being compared to determine if a pair of position coordinates being compared are the same as each other or differ from each other by exactly one.

Firstly, it is determined whether the two position coordinates being considered, excluding the least significant bits of the position coordinates, are the same as each other. This can be done in any suitable and desired manner. In an embodiment this determination is done by performing a bitwise comparison for each bit position except the least significant bit of the position coordinates, followed by an AND-reduction of the result of the bitwise comparison, to provide an output indicative of whether the position coordinates excluding the least significant bits of the position coordinates are the same as each other (or not). The bitwise equality comparisons can be done using an XNOR gate, for example.

The least significant bits of the position coordinates are also compared to determine whether they are the same as each other or differ from each other by exactly one. Again, this can be done in any suitable and desired manner. This in an embodiment provides an output indicative of whether: the least significant bits of the position coordinates are the same as each other, or, where the least significant bits are not the same, of which position coordinate has the greater least significant bit.

As well as performing the comparison of all the bits of the position coordinates excluding the least significant bit, and the separate, least significant bit comparison, a further output value for the pair of position coordinates of the texel groups being considered is generated. This output value is generated for all except the least significant bit of the position coordinates, and so will comprise an n−1 bit output value for the respective pair of position coordinates being considered.

To generate this output value for the position coordinates for the pair of texel groups being considered, firstly for each of the position coordinates of the two texel groups being considered, an XOR operation is performed to XOR the least significant bit of the coordinate at least with all the bits in the coordinate except the least significant bit in the coordinate. This XOR operation could XOR all the bits including the least significant bit with the least significant bit, or XOR all the bits except for the least significant bit with the least significant bit, as desired, and will, and in an embodiment does, provide an n-bit or an (n−1) bit XOR modified coordinate value for each texel group accordingly. This XOR operation can be performed in any suitable and desired manner. The XOR modified coordinate value is in an embodiment generated only once per coordinate (and retained as required) (this will amortize the cost of the operation across comparing many pairs of groups, for example).

An (n bit or n−1 bit) mask value is then generated from each XOR modified coordinate value by scanning each XOR modified coordinate value from its least significant bit to its most significant bit and setting the corresponding bit in the mask for each bit in the XOR modified coordinate value from the least significant bit to the most significant bit up to and including the first bit in the XOR-modified coordinate value that has a value of 1. (Any bit positions in the mask value for bits in the XOR modified coordinate value after the first bit in the XOR-modified coordinate value that has a value of 1 (in the direction from the least significant bit to the most significant bit) should not be, and in an embodiment are not, set, in the mask value.) Again, this can be done in any suitable and desired manner.

(Where the bit in the mask is to be set in this process, the bit is in an embodiment set to a value of "1" (but it would be possible equally to operate the technology described herein where a "set" bit has a value of "0", if desired).)

The so-generated mask values for each position coordinate are then bitwise compared for each bit position except the least significant bit of the position coordinates to thereby generate an n−1 bit output value for the pair of texel groups. (Thus where the mask values are n−1 bits long (so an XOR of the LSB with the LSB was not generated), the bitwise comparison will compare all the bits of the mask values (in a bitwise manner), but where the mask values are n bits long (so an XOR of the LSB with the LSB was generated), the bitwise comparison will compare all the bits of the mask values except for the LSBs of the mask values (in a bitwise manner).)

In particular, for each bit position in the mask values for each bit position except the least significant bit of the position coordinates, it is determined whether the mask values for that bit position for the first and second texel group position coordinates are both set, are both not set, or only one of the mask values is set.

In the case where both the mask values for a bit position are set, then the output bit for that bit position in the output value is set (again, this is in an embodiment set to "1", but arrangements in which a "set" bit has a value of "0" could be used instead, if desired). When only one of the mask values for the bit position is set, then the output bit for that bit position in the output value is not set.

When both of the position coordinate masks are not set for a bit position, then a comparison of the actual position coordinate values for that bit position is also used, and when the bit values for the bit position in the position coordinates are the same, the output bit for that bit position in the output value is set, but not otherwise.

It would be possible in this regard to do a new comparison of the bit values of the position coordinates for the texel groups for the bit position in question, but in an embodiment, this process uses the result of the bitwise comparison that is used to determine whether the position coordinates for the first and second texel groups excluding the least significant bits of the position coordinates are the same as each other. This enhances the efficiency of the process, as the result of the bitwise comparison for determining whether the position coordinates for the first and second texel groups excluding the least significant bits of the texel position coordinates are the same as each other can be reused for this mask value comparison and output value generation.

The determination of whether the mask values for a given bit position are both set, or both not set, or only one of the mask values is set, can again be performed in any suitable and desired manner.

Once the n−1 bit output value has been generated in this way (by considering the mask values for each bit position and, if necessary the bit values for each bit position), it is then determined whether all the bits of the output value for the pair of texel groups (and the position coordinate in question) have been set or not. Again, this can be done in any suitable and desired manner, and in an embodiment provides an output indicative of whether all the bits in the so-generated output value for the pair of texel groups (for the position coordinate in question) have been set or not.

Once it has been determined whether the position coordinates excluding the least significant bits of the position coordinates for the first and second texel groups are the same as each other, the least significant bits of the position coordinates for the first and second texel groups have been compared, and it has been determined whether all the bits in the output value generated using the (n−1)-bit masks have been set or not, those results (outputs) are used to determine whether the position coordinate for the first texel group of the pair and the corresponding position coordinate for the second texel group of the pair are the same as each other or differ from each other by exactly one.

This can be done in any suitable and desired manner.

In an embodiment, when it is determined that the position coordinates excluding their least significant bits are the same, and that the least significant bit of the position coordinate for the first texel group is the same as the least significant bit of the position coordinate for the second texel group, it is then determined that the position coordinate of the first texel group is the same as the position coordinate for the second texel group.

In an embodiment, when it is determined that the position coordinates excluding their least significant bits are the same, and that the least significant bit of the position coordinate for the first texel group is less than the least significant bit of the position coordinate for the second texel group, it is then determined that the position coordinate for the first texel group is exactly one less than the position coordinate for the second texel group.

In an embodiment, when it is determined that the position coordinates excluding their least significant bits are the same, and that the least significant bit of the position coordinate for the first texel group is greater than the least significant bit of the position coordinate for the second texel group, it is then determined that the position coordinate for the first texel group is exactly one greater than the position coordinate for the second texel group.

In an embodiment, when it is determined that all the bits in the output value generated using the (n−1)-bit masks have been set, and that the least significant bit of the position coordinate for the first texel group is less than the least significant bit of the position coordinate for the second texel group, it is then determined that the position coordinate for the first texel group is exactly one greater than the position coordinate for the second texel group.

In an embodiment, when it is determined that all the bits in the output value generated using the (n−1)-bit masks have been set, and that the least significant bit of the position coordinate for the first texel group is greater than the least significant bit of the position coordinate for the second texel group, it is then determined that the position coordinate for the first texel group is exactly one less than the position coordinate for the second texel group.

In all other cases, it is in an embodiment determined that the position coordinates are not equal and do not differ from each other by exactly one (are other than equal and other than differ from each other by exactly one).

Once it has been determined whether the position coordinates are equal or differ from each other by exactly one, that determination is then used to determine whether the first texel group and the second texel group of the pair overlap each other in the texture at all. As discussed above, this overlap determination in an embodiment takes account of the results for both of the position coordinates of the texel groups that have been considered.

The overlap determination can be performed in any suitable and desired manner.

In an embodiment, when it is determined that both position coordinates for both texel groups are the same, it is determined that the texel groups completely overlap (and so will use the same cache lines).

In the case where both position coordinates are not the same, but one of the position coordinates is determined to be the same and the other position coordinate is determined to differ from each other by exactly one, then it is in an embodiment determined that the texel groups overlap each other in part (and so may use, at least in part, the same cache lines). This may depend, for example, and in an embodiment, upon the size of the texel groups that are being considered.

At least in the case where 2×2 texel groups are being considered, then if one pair of coordinates are equal and the other coordinates differ by exactly one, it is in an embodiment determined that the two texel groups overlap with each other (in part) (and in this case that two texels of each of the 2×2 groups overlap with each other).

In the case where both position coordinates are determined to differ from each other by exactly one, then it is in an embodiment determined that the texel groups overlap each other in part (and so may use, at least in part, the same cache lines). This may depend, for example, and in an embodiment, upon the size of the texel groups that are being considered.

Again for 2×2 texel groups at least, in the case where both position coordinates differ from each other by exactly one, then it is in an embodiment determined that the texel groups overlap with each other (in part) (and in an embodiment that one texel of each 2×2 group overlaps).

In the case where it is determined that the position coordinates for the texel groups are neither equal nor differ from each other by exactly one, then it is in an embodiment determined that the texel groups do not overlap with each other at all (for 2×2 texel groups at least).

Other and corresponding arrangements can be used for other sizes of texel groups, as appropriate.

In an embodiment, the selection of which texels to fetch based on the determination of the texel group overlap (as discussed above) also takes account of how many and what distribution of cache lines will be used for texels of the texel group (and in an embodiment of each texel group that is being considered).

For example, and in an embodiment, depending upon the position of a texel group in the texture, it could be that the texels of a group will belong to only a single cache line or could belong to plural cache lines. For example, in the case of 2×2 texel groups, all the texels of the texel group could use the same, single cache line, or the texel group could use two cache lines, or the texel group could use four cache lines (in the case where each texel of the texel group belongs to a different cache line). Thus, when trying to identify whether texel groups use the same cache line (for at least some of their texels), and so can be fetched in the same cycle, it may be desirable also to consider the distribution of the cache lines that will be used by the texel groups (as well as whether the texel groups themselves overlap or not), and in an embodiment, this is done.

Thus, in an embodiment, the texel group overlap determination using the position coordinates of the groups of texels is used together with a determination of how the texels of the texel groups are distributed across cache lines, to identify texel groups having texels that use the same cache line, with the process then in an embodiment operating to fetch texels of texel groups that use the same cache line(s) in a fetch cycle.

To facilitate this operation, a (and in an embodiment each) texel group in an embodiment also has associated cache line distribution data (metadata), that indicates how many cache lines the texels of the texel group span (i.e. will use). In an embodiment this cache line distribution data is provided separately for each position coordinate, and indicates if the texels of the texel group span two cache lines in the coordinate in question or not.

Although the technology described herein has been described above with particular reference to the comparison of corresponding position coordinates for a pair of texel groups, as discussed above, in an embodiment, the corresponding position coordinates of plural pairs of texel groups are compared and considered in the above manner, to determine if the texel groups overlap with each other at all.

In an embodiment, for a set of n texel groups to be fetched (where n is an integer greater than 2), the position of each texel group of the set of n texel groups is considered and compared in the above manner with the position of each other texel group in the set of n texel groups, to determine if the texel group overlaps with any of the other texel groups in the set. In other words, for a set of n texel groups, the position of every texel group in the set is in an embodiment compared to every other texel group in the set in a pairwise manner, to determine if the texel groups overlap with each other at all.

In an embodiment this is done so as to provide for each different pair of texel groups in the set, an output indicating whether the position coordinates for the texel groups in the pair (and for each respective position coordinate) are the same as each other or differ from each other by exactly one (and in this case, which texel group has the larger position coordinate).

This can effectively be considered as generating two (a pair of) n×n matrices (where n is the number of texel groups in the set of texel groups being considered), with the entries in a first "equality" matrix of the pair of matrices indicating whether the two position coordinates for the texel that the matrix entries represent are the same as each other (equal) (or not), and the entries in the second, "difference by one" matrix, of the pair of matrices indicating whether the two position coordinates for the texel groups that the matrix entries represent differ from each other by exactly one (or not).

In an embodiment, an entry in the "equality" matrix that indicates whether the two position coordinates for a pair of texel groups that the matrix entry position represents are the same as each other is set when it is determined that the two position coordinates are the same as each other (and in this case both matrix entries Aij and Aji that correspond to the two texel groups being considered can be set, as this "equality" matrix will be symmetrical).

Correspondingly, for the "difference by one" matrix, an entry in the matrix is in an embodiment set where the position coordinate for one texel group is greater than the position coordinate for the other texel group by exactly one. In an embodiment a matrix entry is set if the position coordinate of the first texel group of the pair of texel groups that the matrix entry represents is greater by one (so if the position coordinate of the second texel group of the pair of texel groups that the matrix entry represents is greater by one, the entry is not set), i.e. if position coordinate i is less than position coordinate j, matrix entry Bij is set, but matrix entry Bji is not set (and vice-versa). The "reverse" position entry in the difference by one matrix should be left unset, as that matrix will not be symmetric.)

The values in the matrices can then be used to determine if the position coordinates of any of the groups of texels are equal or differ from each other by exactly one.

In an embodiment (two) respective sets of pairs of n×n matrices are determined, one for each different position coordinate (u, v).

It will be appreciated that these embodiments of the technology described herein can be, and are in an embodiment, used by any (and all) texture mapping operations where plural groups of texels are to be fetched, and it is desirable to be able to select the texels of the texel groups that are fetched in a fetch cycle so as to increase the efficiency of the texel fetching process. Thus, these embodiments of the technology described herein should be, and are in an embodiment, performed as required when generating a render output, and may be, and are in an embodiment, performed in respect of plural texture mapping operations, such as when performing plural texture mapping operations when generating a given render output, and/or for a set or sequence of render outputs being generated.

The operation in the manner of the technology described herein to assess the texel group overlap and fetch texels for processing accordingly can be performed and arranged at any suitable point and position in the overall texel fetching and texture mapping process. In an embodiment, this process is performed when fetching texels from the texel cache (when looking up texels in the texel cache). Thus the texel fetching circuit will be operable to fetch texels of a texture for use by the texture mapper to perform graphics texturing operations from the texel cache, and the texel selecting circuit will be associated with that texel fetching circuit, and configured to select texels of groups of texels to fetch in a fetch cycle based on the overlap determination, and to cause the texel fetching circuit to fetch the selected texels of the groups of texels from the texel cache in a fetch cycle.

Other arrangements would be possible. For example, where there is a texel fetching circuit operable to fetch texels from memory into the texel cache, the overlap determination and texel selection could be configured and arranged to operate at that point, i.e. to select and cause to be fetched selected texels of the groups of texels from the memory into the texel cache in a fetch cycle.

In an embodiment, the texture mapper includes a texel fetching circuit operable to fetch texels from the texel cache for use by the texture mapper to perform graphics texturing operations, and there is also a texel fetching circuit between the texel cache and the main (system) memory where the textures are stored that is operable to fetch texels from the memory into the texel cache. In this case, the texel selection and texel group overlap determination, etc., is in an embodiment arranged in and operates as part of the process of fetching the texels from the texel cache for use by the texture mapper.

The texture mapper (texture mapping apparatus) and texture mapping process in these embodiments of the technology described herein is in an embodiment part of and/or performed by a graphics processor.

The graphics processor may otherwise include any one or more or all of the processing stages that a graphics processor (processing pipeline) can normally include. Thus, for example, the graphics processor may include a primitive setup stage, a rasteriser and/or a renderer.

In an embodiment, the graphics processor includes a renderer operable to perform graphics rendering operations, and the texture mapper is operable to perform graphics texturing operations in response to requests for graphics texturing operations from the renderer. The renderer is in an embodiment in the form of or includes a programmable fragment shader (that processes graphics fragments by executing fragment shader programs using respective execution threads for sampling positions of a render output being generated by the graphics processor).

The graphics processor (processing pipeline) may also contain any other suitable and desired processing stages that a graphics processing pipeline may contain such as a depth (or depth and stencil) tester(s), a blender, a tile buffer or buffers, a write out unit, etc.

The technology described herein can be used for any form of output that a graphics texture mapper and graphics processor may be used to generate. In one embodiment it is used when a graphics processor is being used to generate images for display, but it can be used for any other form of graphics processing output, such as (e.g. post-processed) graphics textures in a render-to-texture operation, etc., that a graphics processor may produce, as desired. It can also be used when a texture mapper, graphics processor, etc., is being used to generate other (e.g. non-image or non-graphics) outputs.

Although the technology described herein has been described above with particular reference to texture mapping operations in graphics processors, as discussed above, a key aspect of the technology described herein is the efficient manner in which the equality and difference by exactly one of the position coordinates for the texel groups is detected. The Applicants believe that such techniques for determining whether two n-bit binary values are the same as each other or differ from each other by exactly one is new and advantageous in its own right, and may be useful for comparing data values in data processing systems more generally (where it would be desirable and advantageous to identify data values that are the same as each other or that differ from each other by exactly one). For example, the technology described herein is especially efficient when doing an all-to-all comparison of a large number of values (whether coordinates or otherwise).

For example, this may be useful in graphics processing for a depth comparison of many fragment groups (e.g. quads of 2×2 fragments), e.g. where it is desired to determine which fragment group is at the front and so should be rendered (with the rest being discarded), especially when the fragment groups may not be aligned (that is their coordinates could be offset by one unit). The equality and difference-by-one detection of the technology described herein could be used to determine which ones of a large number of such fragment groups (e.g. quads) overlap (and how), to then facilitate a depth comparison of the overlapping fragment groups.

In a non-graphics processing context, the technology described herein could equally be used when it is desirable to cluster data, for example to determine which data values are approximately within a certain distance from each other. In this case, the equality and difference-by-one determination of the technology described herein could be used to determine which data values are within range (e.g. following a pre-processing step of dividing the values by half the distance (to give integer values)). This could be used for clustering any set of data values, such as velocity, weight, and colour values, etc. A multi-dimensional clustering process could use the techniques of the technology described herein for each dimension, and then post-process the results in an appropriate manner.

Thus, a further embodiment of the technology described herein comprises a method of determining whether a first n-bit binary data value and a second n-bit binary data value in a data processing system are the same as each other or differ from each other by exactly one, the method comprising:

determining whether the first and second data values excluding the least significant bits of the data values are the same as each other;

comparing the least significant bit of the first data value to the least significant bit of the second data value to determine whether: the least significant bits of the data values are the same as each other; the least significant bit of the first data value is greater than the least significant bit of the second data value; or the least significant bit of the first data value is less than the least significant bit of the second data value;

for each of the first and second data values:
  performing an XOR operation with the least significant bit of the data value at least for all of the bits except the least significant bit in the data value to provide an XOR-modified data value; and
  generating a mask value from each XOR-modified data value by scanning each XOR-modified data value from its least significant bit to its most significant bit, and setting the corresponding bit in the mask for each bit in the XOR-modified data value from the least significant bit to the most significant bit up to and including the first bit in the XOR-modified data value that has a value of one;

for each bit position except the least significant bit of the data values, using the corresponding mask values for the first and second data values for that bit position to set an output bit for that bit position in an (n−1)-bit output value for the two data values, comprising:
  when the mask values for the bit position for the first and second data values are both set, setting the output bit for that bit position in the output value;
  when only one of the mask values for the bit position for the first and second data values is set, not setting the output bit for that bit position in the output value; and
  when the mask values for the bit position for the first and second data values are both not set, also using a comparison of the bit values of the first and second data values for that bit position, and when the bit values for that bit position in the first and second data values are the same, setting the output bit for that bit position in the output value, but when the position coordinate values for the bit position are different, not setting the output bit for that bit position in the output value;

determining whether all the bits in the output value for the two data values have been set or not;

using:
  the result of the determination of whether the position coordinates for the first and second data values excluding the least significant bits of the data values are the same as each other;
  the comparison of the least significant bit of the first data value to the least significant bit of the second data value; and
  the determination of whether all the bits in the output value generated using the mask values for the two data values have been set or not:
    to determine whether the first data value and the second data value are the same as each other or differ from each other by exactly one.

Thus, a further embodiment of the technology described herein comprises an apparatus for determining whether a first n-bit binary data value and a second n-bit binary data value in a data processing system are the same as each other or differ from each other by exactly one, the apparatus comprising:
  a data value comparing circuit configured to determine whether a first n-bit binary data value and a second n-bit binary data value excluding the least significant bits of the data values are the same as each other, and to provide an output indicating whether the first n-bit binary data value and the second n-bit binary data value excluding the least significant bits of the data values are the same as each other;
  a least significant bit comparison circuit configured to compare the least significant bit of the first data value to the least significant bit of the second data value and to provide an output indicating whether: the least significant bits of the data values are the same as each other; the least significant bit of the first data value is greater than the least significant bit of the second data value; or the least significant bit of the first data value is less than the least significant bit of the second data value;
  a mask value generating circuit configured to, for each of the first and second data values:
    perform an XOR operation with the least significant bit of the data value at least for all of the bits except the least significant bit in the data value to provide an XOR-modified data value; and
    generate as an output from each XOR-modified data value a mask value by scanning each XOR-modified data value from its least significant bit to its most significant bit, and setting the corresponding bit in the mask for each bit in the XOR-modified data value from the least significant bit to the most significant bit up to and including the first bit in the XOR-modified data value that has a value of one;
  an output value generating circuit, configured to generate an (n−1)-bit output value for the pair of data values using the mask values generated by the mask value generating circuit by:
    for each bit position except the least significant bit of the data values, using the corresponding mask values for the first and second data values for that bit position to set an output bit for that bit position in an (n−1)-bit output value for the two data values, comprising:
      when the mask values for the bit position for the first and second data values are both set, setting the output bit for that bit position in the output value;
      when only one of the mask values for the bit position for the first and second data values is set, not setting the output bit for that bit position in the output value; and when the mask values for the bit position for the first and second data values are both not set, also using a comparison of the bit values of the first and second data values for that bit position, and when the bit values for that bit position in the first and second data values are the same, setting the output bit for that bit position in the output value, but when the position coordinate values for the bit position are different, not setting the output bit for that bit position in the output value;
  an output value assessment circuit configured to provide an output indicating whether all the bits in the output value for the two data values have been set or not; and
  a data value equality and difference determining circuit configured to use the output of the data value comparing circuit, the output of the least significant bit comparison circuit, and the output of the output value assessment circuit:
    to determine whether the first data value and the second data value are the same as each other or differ from each other by exactly one.

As will be appreciated by those skilled in the art, these embodiments of the technology described herein can, and in an embodiment do, include any one or more or all of the features of the technology described herein described herein.

Thus, for example, the determination of whether the first and second data values excluding the least significant bits of the data values are the same as each other, the comparison of the least significant bits of the data values to determine if they are the same or which data value has the greater least significant bit, and the determination of whether all the bits in the output value for the pair of data values generated using the mask values have been set or not, can be, and are in an embodiment, performed in the manner discussed above for the position coordinates, and those results (outputs) are correspondingly in an embodiment used to determine whether the first data value and the second data value are the same as each other or differ from each other by exactly one in the manner discussed above for the position coordinates.

Correspondingly, these embodiments of the technology described herein are in an embodiment used to (pairwise) compare data values of a set of plural data values to determine if any of the data values in the set are the same as each other or differ from each other by exactly one.

Correspondingly, in these embodiments of the technology described herein, the data values that are being compared are in an embodiment position coordinates (e.g. texture position coordinates or fragment position coordinates), but could be, and in other embodiments are, other data values, such as for example, data values that it is desired to cluster.

As will be appreciated from the above, the technology described herein may be implemented in any suitable and desired graphics/data processing system and graphics/data processor. Thus the data, e.g. graphics, processor that incorporates the equality and difference by one detection circuit and process of the technology described herein may be, and typically will be, part of an overall graphics and/or data processing system. Thus, the technology described herein also extends to a data or graphics processing system having a data/graphics processor and/or an equality and difference-by-one detecting circuit as described herein.

The data (e.g. graphics) processing system may comprise the memory or memories (memory system) referred to herein, which may be external to the data, e.g., graphics processor. As discussed above, the memory or memories may be operable to store, and may store, a set of textures (texture maps) to be used in texturing operations (and/or other data sets/arrays, as required).

Thus, as will be appreciated, embodiments of the technology described herein may be implemented in a data/graphics processing system comprising a memory and a processing unit (a processor) comprising an equality and difference-by-one detecting circuit as described herein. In an embodiment, the data/graphics processing system may further include a host processor that executes applications that can require data or graphics processing by the processor and that instruct the processor accordingly (e.g. via a driver for the processor). The system may further include appropriate storage (e.g. memory), caches, etc.

The data/graphics processing system and/or processor may also comprise, and/or be in communication with, one or more memories and/or memory devices that store the data described herein, and/or that store software for performing the processes described herein. The data/graphics processing system and/or processor may also be in communication with a host microprocessor, and/or with a display for displaying images based on the data generated.

In one embodiment, the various functions of the technology described herein are carried out on a single data or graphics processing platform that generates and outputs the required data.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein in the context of texture mapping in graphics processing will now be described.

FIG. 1 shows an exemplary data processing system in which the present embodiments may be implemented.

The exemplary data processing system shown in FIG. 1 comprises a host processor comprising a central processing unit (CPU) 57, a graphics processor (GPU) 100, a video codec 51, a display controller 55, and a memory controller 58. As shown in FIG. 1, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 2:
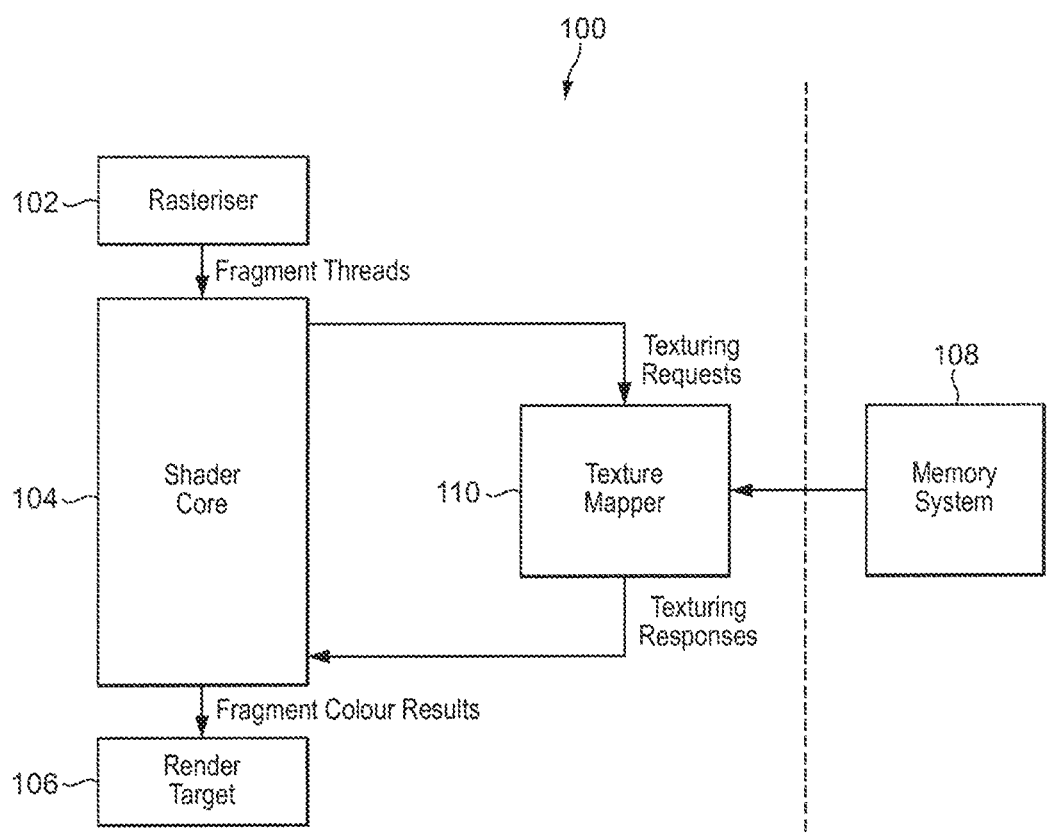
FIG. 2 shows schematically a graphics processor that includes a texture mapper.

FIG. 2 shows the graphics processor (graphics processing unit (GPU)) 100 in more detail.

As shown in FIG. 2, the GPU 100 comprises data processing circuitry that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When requested by the fragment shader 104 to perform a texture mapping operation, the texture mapper 110 reads textures from the memory 108 (as required), performs the texture mapping operation, and returns a (e.g. RGB colour) value sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

Figure 3:
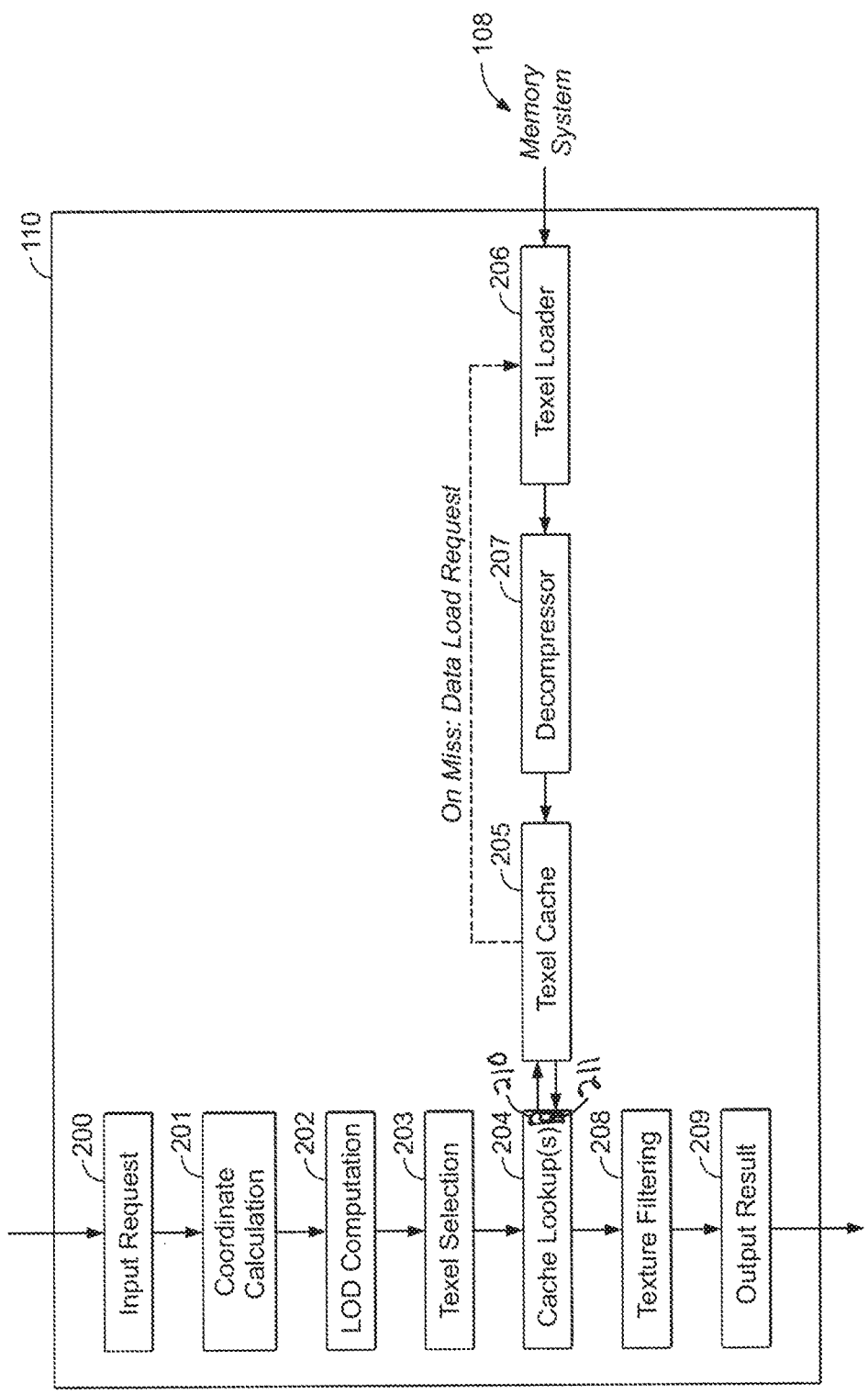
FIG. 3 shows schematically an exemplary graphics texture mapper in more detail.

FIG. 3 shows an exemplary texture mapper (texture mapping apparatus) 110 in more detail.

As shown in FIG. 3, the texture mapper 110 includes a number of processing stages (circuits), including an input request stage (circuit) 200 that accepts texture mapping operation requests from a renderer (e.g. the fragment shader 104 in FIG. 1). This is followed by a coordinate calculation stage (circuit) 201 that, for example, will convert an arbitrary coordinate included with a texture mapping operation request into an appropriate canonical coordinate between 0.0 and 1.0 to be used when sampling the texture.

There is then, if necessary, a level of detail (LOD) computation stage (circuit) 202, that can determine the level of detail at which the texture is to be sampled for the texture mapping operation (e.g. that selects the mipmap levels to use and how to filter between them in the case where the texture is in the form of mipmaps). This level of detail computation may not be necessary, for example where the fragment shader program itself can explicitly indicate the level of detail to be used, or a texture is not stored in the form of mipmaps.

There is then a texel selection stage (circuit) 203, which uses the coordinate determined by the coordinate calculation stage 201 to determine the actual texels (texture data elements) in the texture (and, if appropriate, the determined mipmap levels in the texture) to be used for the texture mapping operation.

The required texels (their data) are then fetched by a cache lookup stage (circuit) 204. The cache lookup circuit 204 further include, a texel group overlap determining circuit 210 that includes an "equality and difference-by-one" detection circuit 211, in the manner of the technology described herein. This will be discussed in more detail below.

As shown in FIG. 3, although the texture data will be stored in the memory system 108, when that texture data is needed by the texture mapper 110, the texture data required for the texturing operation will be fetched from the memory 108 where it is stored, and first loaded into a texture cache 205 of or accessible to the texture mapper 110, with the texture mapper 110 then reading the texture data (by the cache lookup circuit 204) from the texel cache 205 for use.

As shown in FIG. 3, the texture mapper 110 may accordingly comprise a texel loader (a texel loading circuit) 206 that is operable to load data of texels from textures stored in the memory 108 for storing in the texel cache 205. There may also be a decompressor (decoder) stage (circuit) 207 that can decompress (decode) textures that are stored in a compressed (encoded) format in the memory system 108 before storing the texel values in the texel cache 205.

Once the required texels (texel data values) have been fetched from the texel cache 205, they are used in the required texture filtering operation by a texture filtering stage (circuit) 208 to generate an appropriate output result for the texture position (coordinate) being sampled, which output result is then appropriately packaged and returned to the fragment shader by an output result stage (circuit) 209. The texture filtering circuit 208 may, for example, perform any desired form of filtering using the fetched texel values, such as bilinear or trilinear, or any other form of filtering, to generate the desired filtered sample result.

As shown in FIG. 3, the cache lookup circuit 204 requests texels (the data values of texels) needed for a texture filtering operation from the texel cache 205, and when those texels are not already present in the texel cache 205 (there is a cache miss), a data load request is sent to the texel loader 206 to load the required texels from the texture in the memory system 108 into the texel cache 205. (The texels may be loaded from the main memory itself, or from a cache, such as the L2 cache, of the memory system cache hierarchy.)

In the present embodiments, the texels are organised in the texel cache 205 by reference to their coordinates (positions) in the texture. Thus, each cache line in the texel cache

205 stores (data of) a plurality of texels that are from contiguous positions in the texture in question, and is tagged (identified) by reference to the position in the texture of the texels that are stored in the cache line (in contrast, e.g., to being identified and tagged by reference to the memory address at which the texels are stored). In this embodiment, each cache line is tagged with a lower-precision version of the texture coordinates of the first texel in the cache line (other arrangements would, of course, be possible).

In view of this, the cache lookup circuit 204 addresses the texel cache 205 using the coordinates of the texels whose data is required for the texture filtering operation. Correspondingly, the texture loader 206 is operable to convert texture coordinate-based misses in the texel cache 205 into memory address-based data fetches from the memory system 108.

Figure 4:
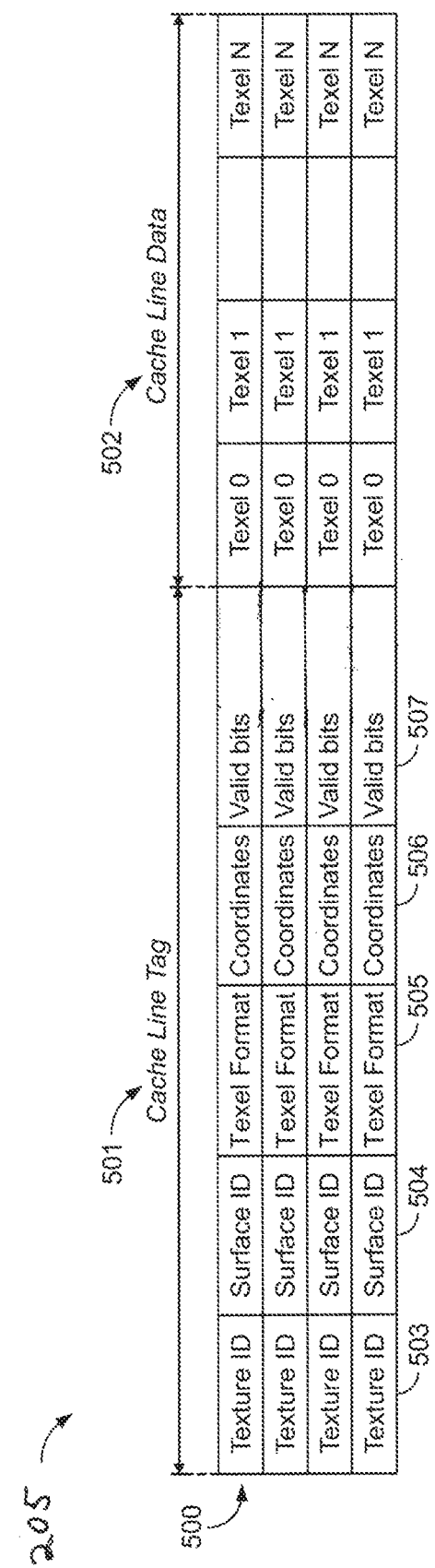
FIG. 4 shows the configuration of the texel cache in the present embodiment.

FIG. 4 illustrates this, and shows the configuration of the texel cache 205 in this embodiment.

As shown in FIG. 4, the texel cache 205 includes a plurality of cache lines 500 (four cache lines are shown in FIG. 4, but the number of cache lines in the texel cache 404 may be as desired), with each cache line having a corresponding tag 501 that can be used to identify the data in the cache line, and storing data for plural (e.g. up to 16) texels 502.

As shown in FIG. 4, each cache line 500 is tagged with, in this embodiment, the following data fields to allow the texel data that is stored in the cache line to be identified: the identity of the texture 503 that the texels in the cache line relate to; the surface 504 within that texture that the texels in the cache line relate to (e.g. where the texture is in the form of a set of mipmaps) (this could indicate, e.g., which mipmap, cubemap or array texture to use (i.e. give an appropriate surface indication for any higher order texture type that has multiple surfaces)); and a set of texture coordinates 506 identifying (representing) the position in the texture of the texels stored in the cache line.

As shown in FIG. 4, each cache line tag 501 also includes other metadata, such as an indication of the texel format 505 of the texels in the cache line, and a set of valid bits 507 indicating whether data in the cache line is valid or not.

Other cache arrangements would, of course, be possible.

In the present embodiments, there will typically be a plurality of texture mapping operations waiting for texels that they need to be fetched from the texel cache 205. Thus, there will typically be a plurality of texels that need to be fetched from the texel cache 205 for waiting texture mapping operations. It is assumed that in any given fetch cycle, the cache lookup can fetch a plurality of texels distributed in up to a particular, maximum, number of cache lines of the texel cache 205. For example, the cache lookup may be able to fetch up to 16 texels per cycle, distributed in up to four cache lines. Other arrangements would, of course, be possible.

Furthermore, it is assumed that the texels are arranged and fetched as respective 2×2 groups of neighbouring texels, each corresponding to a bilinear lookup, in the following arrangement:

0 1
2 3

Texel 0: top-left texel
Texel 1: top-right texel
Texel 2: bottom-left texel
Texel 3: bottom-right texel Thus, for example, 16 texels would be fetched as four 2×2 texel groups.

As discussed above, in the present embodiments, the texel cache 205 is organised such that each cache line stores texels from a respective region (position) in the texture. Thus, depending upon where the texels in a 2×2 texel group that is to be fetched are located in the texture, a given 2×2 texel group can use from one to four cache lines (the latter happening when each texel is in a different cache line).

It is important in graphics processing to maximise throughput. In the case of texture mapping operations, the throughput is dependent on the speed of the texel cache accesses. In order to improve the speed of the texel cache accesses, it is desirable to maximise the number of texels that can be fetched from the cache in each fetch cycle. In order to do this, it is desirable to identify which texels belong to the same cache line (as then those texels can be fetched together in the same fetch cycle).

As discussed above, in the present embodiments, the texels are organised in the texel cache 205 on the basis of their positions. Therefore, in order to determine which texels from different 2×2 texel groups being fetched belong to the same cache line in the texel cache 205, in the present embodiments it is detected whether any of the 2×2 texel groups waiting to be fetched overlap (i.e. occupy the same positions in the texture) at least in part or not (since any overlapping texels in different 2×2 texel groups may then reside in the same cache line in the texel cache 205).

In particular, for two 2×2 texel groups A and B of the form discussed above, the following overlapping cases are possible:
a) A and B overlap. In this case, they use the exact same cache lines.
b) Two texels of each 2×2 group overlap:
b1) 1 3 in A with 0 2 in B
b2) 0 2 in A with 1 3 in B
b3) 2 3 in A with 0 1 in B
b4) 0 1 in A with 2 3 in B
c) One texel of each 2×2 group overlap:
c1) 3 in A with 0 in B
c2) 0 in A with 3 in B
c3) 1 in A with 2 in B
c4) 2 in A with 1 in B
d) A and B do not overlap.

In the present embodiments, to detect such overlaps, the positions of respective 2×2 texel groups are compared to each other to determine if there is any overlap between the 2×2 texel groups. More particularly, the position coordinates (u, v) (or (x, y); (s, t)) of the cache lines that the top-left texels (texel 0) of each pair of 2×2 texel groups being considered belong to are respectively compared to each other. In this case, assuming two texel groups A and B, each having a pair of position coordinates u,v, then:

If both coordinates are equal, then it's "overlap" case a) above.

If group A's u equals group B's u minus one, and v are equal, then it's case b1).

If B's u equals A's u minus one, and v are equal, then it's case b2).

If A's v equals B's v minus one, and u are equal, then it's case b3).

If B's v equals A's v minus one, and u are equal, then it's case b4).

If A's u equals B's u minus one, and A's v equals B's v minus one, then it's case c1).

If B's u equals A's u minus one, and B's v equals A's v minus one, then it's case c2).

If A's u equals B's u minus one, and B's v equals A's v minus one, then it's case c3).

If B's u equals A's u minus one, and A's v equals B's v minus one, then it's case c4).

In any other case, it's case d), and A and B do not share any cache lines.

Thus, a comparison of the position coordinates for the top-left texels of each 2×2 texel group will allow it to be determined whether the texel groups whose positions are being compared overlap at all or not. (The positions of other texels in the 2×2 texel group other than the top-left texel for the 2×2 texel groups could instead be compared (with the overlapping cases being modified accordingly), if desired.)

In the present embodiments, such comparisons of the positions of pairs of 2×2 texel groups to determine if they overlap at all are performed for sets of plural 2×2 texel groups together, to determine if any of the 2×2 texel groups in the set of plural 2×2 texel groups to be fetched overlap at all with each other, with the cache lookup 204 then selecting which texels of the 2×2 texel groups to fetch in the fetch cycle based on the overlap determination (and in particular to preferentially fetch texels of 2×2 texel groups that have been determined to overlap and thus occupy the same cache lines (at least in part), so that they can be fetched together in the same fetch cycle, thereby increasing the number of texels that can be fetched per fetch cycle).

Figure 5:
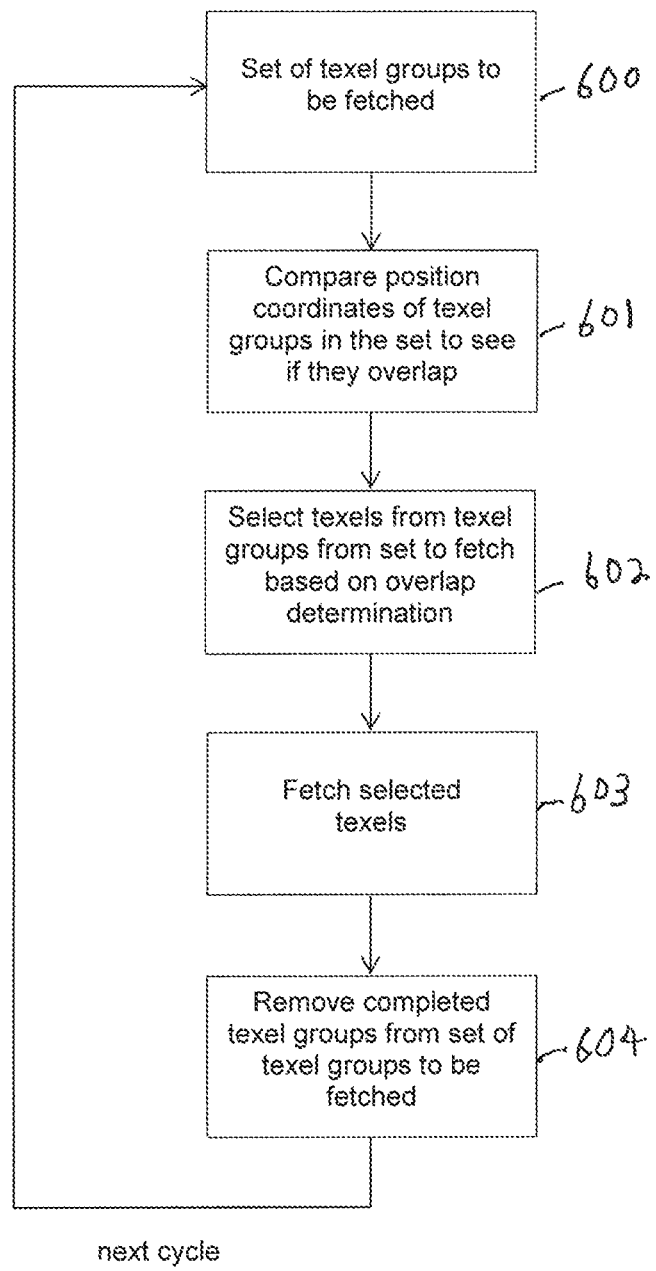
FIG. 5 shows the fetching of texel groups into the texel cache in an embodiment of the technology described herein.

FIG. 5 illustrates this.

As shown in FIG. 5, there will be a set of plural texel groups that need to be fetched from the texel cache 205 (step 600).

The texel group overlap determining circuit 210 of the cache lookup circuit 204 will then compare the position coordinates for all of the texel groups in the set to see if any of the texel groups in the set overlap (step 601). (This operation will be discussed in more detail below.)

The texel group overlap determining circuit 210 of the cache lookup circuit 204 will then select texels from some or all of the texel groups from the set to fetch from the texel cache 205 in the fetch cycle based on the overlap determination (step 602).

In the present embodiments, the texel group overlap determining circuit 210 operates to pick a cache line used by a texel group, and then lookup/fetch all the texels of any waiting group using that cache line (which are detected by the overlap determinations as described above). Thus a cache line(s) used by a first texel group is identified and it is then determined based on the overlap determination which texels from other texel groups use that cache line(s). That is, if a cache line from group A is picked, then any texels in other groups overlapping with that line can be processed the cycle.

Other arrangements would, of course, be possible.

The number of texel groups that can be fetched in a given fetch cycle will be constrained to be less than or equal to a maximum number of texels, and less than or equal to a maximum number of cache lines. Thus depending upon how many texel groups there are waiting to be fetched and the extent to which those texel groups have been determined to overlap with each other or not (i.e. to belong to the same cache lines or not), the texel loader will be able to select some or all of the texel groups to fetch in the fetch cycle. Thus the texel loader may select only a subset of the texel groups in the set to be fetched in the cycle, e.g., if there are more texel groups than can be fetched in a fetch cycle in any event, and/or the texel groups do not overlap sufficiently such that they occupy too many cache lines.

In general, the texel group overlap determining circuit 210 of the cache lookup circuit 204 will operate preferentially to select texels of texel groups from the set to fetch in the fetch cycle that have been determined to overlap with each other, so as to maximise the number of texels that can be fetched from the texel cache 205 in the fetch cycle.

The texel group overlap determining circuit 210 of the cache lookup circuit 204 will then fetch the selected texels in the fetch cycle (step 603).

If the fetched texels mean that all the texels of a group of texels have now been fetched from the cache, the "completed" group of texels is removed from the set waiting to be fetched (step 604).

The process will then be repeated for the next fetch cycle to determine those texels to be fetched in that fetch cycle, and so on.

It can be seen from the above, that a pair of 2×2 texel groups will overlap with each other if the respective "u" coordinates for the top-left texels of the 2×2 texel groups are the same as each other or differ from each other by exactly 1, and the "v" coordinates of the top-left texels for the texel groups are the same as each other or differ from each other by exactly 1.

Thus, assuming that each group of texels in the set of groups of texels to be fetched has a pair of position coordinates representative of the location of the top-left texel in the group in the texture, any overlap between the groups of texels to be fetched can be detected by, for each group of texels that is being considered, comparing the first (e.g. u) position coordinate for the texel group with the corresponding (e.g. u) position coordinate of each other texel group in the set of texel groups being considered, to determine if the first (u) position coordinates for the texel groups are the same as each other or differ from each other by exactly 1, and comparing the other position coordinate (e.g. v) for the texel group with the corresponding (e.g. v) position coordinate of each other texel group in the set of texel groups being considered, to determine if the other (v) position coordinates for the texel groups are the same as each other or differ from each other by exactly 1.

This operation of detecting whether the position coordinates are equal or differ from each other by exactly one for a set of 2×2 texel groups can be considered to correspond to determining, separately for each position coordinate (u and v), in effect, two n×n matrices (where n is the number of texel groups that are being considered), a first "equality" matrix A which will be set to 1 at entry Aij if the position coordinate in question for the texel group i and the position coordinate in question for the texel group j are equal ($c_i == c_j$), and a "difference by one" matrix B, which will be set to 1 at matrix position Bij if the position coordinate in question for texel group i is one less than the corresponding position coordinate for the texel group j ($c_i == c_j - 1$).

The "equality" matrix A will be 1 in the diagonal (as a number is equal to itself), and will be symmetric (i.e. such that Aji=Aij).

The "difference by one" matrix B will be 0 in the diagonal (since a number cannot differ by one with itself), and will not be symmetric.

The texel group fetching selection process can then use the values of the "equality" matrix A and "difference by one" matrix B entries to determine those texel groups that have identical position coordinates or position coordinates that differ from each other by exactly 1, to thereby identify overlapping texel groups to then preferentially fetch from/into the texel cache.

While it would be possible to, in effect, determine such "equality" and "difference by one" matrices by appropriately comparing each pair of coordinate values in their entirety to derive the corresponding matrix entry, e.g. one after another, the present embodiments do not do this, but instead use a particular mechanism for, in effect, deriving the required equality matrix and difference by one matrix entries for a set of plural texel groups that are being considered, and that, in particular, allows the determinations to be performed using significantly less silicon area and with a much shorter critical path.

Figure 6:
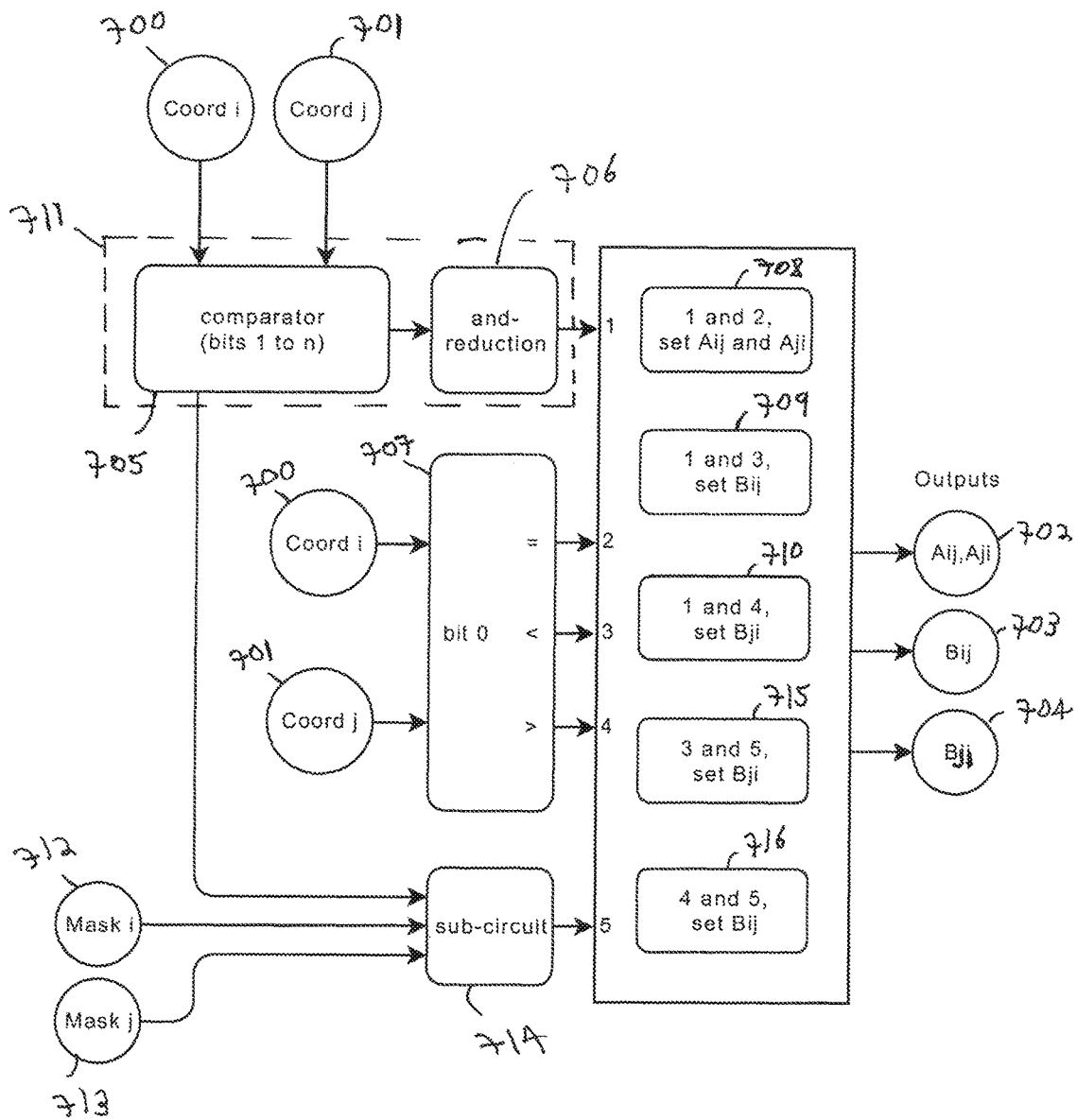
FIG. 6 shows determining whether position coordinate values are equal or differ from each other by exactly one in an embodiment of the technology described herein.

FIG. 6 shows the overall process and circuit for doing this in an embodiment of the technology described herein. This process is carried out by the equality and difference by one detecting circuit 211 of the texel group overlap determining circuit 210 of the cache lookup circuit 204 shown in FIG. 3.

FIG. 6 shows the overall process for a pair of position coordinates i 700, j 701, being considered, and the corresponding generation of the "equality" matrix entries Aij, Aji 702, and the difference by one matrix entries Bij 703 and Bji 704, that will then be used to determine which texel groups overlap and so should therefore be fetched in the next fetch cycle.

The two coordinates i 700, j 701, being considered will be the corresponding position coordinates for a pair of texel groups being considered (e.g. the u coordinates of the pair of texel groups).

This process will be repeated for the corresponding position coordinates for all the texel groups in the set of texel groups that is being considered, and also for each respective position coordinate (separately). Thus a first pair of an "equality" matrix and a "difference by one" matrix will be generated for the set of texel groups for the, e.g. u, position coordinates for the texel groups, and a second pair of an "equality" matrix and a "difference by one" matrix will be generated for all the texel groups for the other, e.g. v, position coordinate of the texel groups being considered.

As shown in FIG. 6, for each pair of coordinates 700, 701 being considered, the process first determines whether the bits excluding the least significant bits (i.e. bits 1 to n, where each coordinate is n bits long and the least significant bit is bit 0) are the same as each other for the two coordinates being compared. As shown in FIG. 6, this is done using a coordinate comparing circuit 711 that performs a bitwise comparison 705 for bits 1 to n of the coordinates, followed by an AND-reduction 706 which will accordingly provide a positive output (an output of "1") when and only when both coordinates have the same values for their bits 1 to n.

This, in effect, determines the following value for the pair of coordinates:
eij=ci[C_WIDTH-1:1]==cj[C_WIDTH-1:1]
(eji=eij)
where C_WIDTH is the number of bits in the coordinate (e.g., 32 bits).

As shown in FIG. 6, the least significant bits (bit 0) of the two coordinates i 700, j 701 are also compared 707, to provide an output indicating: whether those least significant bits are the same as each other; whether the least significant bit of the first coordinate i 700 is less than the least significant bit of the second coordinate j 701; or whether the least significant bit of the first coordinate i 700 is greater than the least significant bit of the second coordinate j 701.

The result of this LSB comparison is then be used, together with the determination 705 and 706 of whether all the bits excluding the least significant bit in the position coordinates 700, 701 being considered are the same, to determine 708 (and output 702) the entries in the "equality" matrix A, as shown in FIG. 6 (since if all the bits in the position coordinates excluding the least significant bit are the same as each other, and the least significant bits are the same, then it follows that the two position coordinates are the same as each other and so both equality matrix A entries Aij and Aji for the pair of position coordinates (texture groups) being considered can be set to indicate that they are the same (since the equality matrix is symmetric)).

In other words, the "equality" matrix A is derived as:
Aij=eij && (ci[0]==cj[0])
Aji=aij The determination of the entries in the "difference by one" matrix B will now be described, with reference to FIGS. 6, and 7.

The Applicants have recognised in particular in this regard that two numbers, A and B, where A=B−1 and B=A+1, are always in the form:
A-xxxxxxxx 0 1111
B-xxxxxxxx 1 0000
prefix pin suffix
and thus each have up to three parts: a "prefix", a "pin" and a "suffix".

The "prefix" is in the MSBs (most significant bits) and is equal for the two numbers A and B (where A=B−1 and B=A+1). The prefix length ranges from 0 to C_WIDTH−1 bits, and is the same length in A and B.

The "pin" is a single bit between the prefix and the suffix, and is different in A and B (where A=B−1 and B=A+1).

The "suffix" is in the LSBs (least significant bits), and it has opposite values in A and B (where A=B−1 and B=A+1). The suffix width ranges from 0 to C_WIDTH bits, and is the same length in A and B.

It is assumed in this regard that A and B are considered as unsigned values only, such that for the maximum representable value of a coordinate, a natural wrap around takes place (thus, for 4-bit numbers, for example, 1111 is equal to 0000 minus one). In this "special" case, the suffix is length C_WIDTH (i.e. A and B are both a suffix). Otherwise, the prefix and suffix combined are always C_WIDTH−1.

There are only two suffix types: one type made up of 0s (a "0-suffix") and one type made up of is (a "1-suffix"). The pin is the opposite value to the suffix, so a 1-pin always appears together with a 0-suffix, and a 0-pin with a 1-suffix.

If A=B−1, then there is always a suffix, a pin, or both. Also, A and B's suffixes are opposite types (if they exist), and the pins are opposite types too.

Furthermore, if the least significant bits of the position coordinates being compared are equal (ci[0] and cj [0] are equal), then the coordinates cannot differ by exactly one, since neither the suffix nor the pin will exist in this case. Therefore, the least significant bits of the position coordinates must differ for the corresponding entry Bij in the difference by one matrix B to be set (i.e. ci[0] and cj [0] must be different for Bij of matrix B to be true).

It follows from this that the cases where the two coordinates A and B differ by one can be split in two types, depending on whether a suffix exists or not:

a) the number ending in one is larger. In this case, no suffix exists, but a pin and prefix do exist.
xxxxxxxxxxxx0
xxxxxxxxxxxx1
prefix pin b) the number ending in zero is larger. In this case a suffix does exist.

In case a) above, the two coordinates being compared will comprise a prefix and a pin, but no suffix. This is equivalent to all the bits excluding the least significant bit of the position coordinates being equal (i.e. eij being true (i.e., the prefixes are equal), but the least significant bits (ci[0] and cj[0]) being different (i.e. the pins are different type). If ci[0] is true, then ci is larger. Otherwise cj [0] is true and cj is larger.

Thus, as shown in FIG. 6, this case can be identified, and the corresponding difference by one entries Bij 703, Bji 704 set, 709, 710 based on and using the determination 705 and 706 of whether all the bits excluding the least significant bit in the position coordinates 700, 701 being considered are the same, and whether the comparison 707 of the least significant bits (bit 0) of the two coordinates i 700, j 701 determined that the least significant bit of the first coordinate i 700 is less than the least significant bit of the second coordinate j 701, or that the least significant bit of the first coordinate i 700 is greater than the least significant bit of the second coordinate j 701.

As this operation uses the same comparison results 711, 707 as are generated for determining the "equality" Matrix A entries, these "difference by one" cases can be determined and generated for essentially no (or very little) additional cost, and using the same processing circuits/circuitry.

For case b) above (where the number ending in zero is larger), the numbers will have a suffix and a pin or just be a suffix (in the "special" case discussed above). Also, the pin and suffix may take up the whole number, in which case there is no prefix.

Case b) can accordingly be stated as: A and B's prefixes are the same length and same value, and the suffixes are different types (and any pins will also be different types).

Therefore, to detect case b), in the present embodiments, the position of the pin (which gives the prefix and suffix length) is determined, and it is then determined whether the prefixes (if they exist) match, and whether the pins (and suffixes) are different types.

To do this in the present embodiments, firstly, for each of the position coordinates of the two texel groups being considered, an XOR operation is performed to XOR the least significant bit of the coordinate at least with all the bits in the coordinate except the least significant bit in the coordinate (the XOR of the LSB with the LSB in the coordinate could also be done if desired, e.g. for simplicity, or that could be omitted, as it is not actually needed). This provides an XOR modified coordinate value for each texel group (which will be n-bits or n–1 bits, depending on whether the XOR of the LSB with the LSB is done). This XOR operation can be performed in any suitable and desired manner.

In other words, for each coordinate cx, xor all its bits (or all except its LSB) with its LSB:
cxor=cx^(C_WIDTH {cx[0]})

This turns a 1-suffix into a 0-suffix (but not vice-versa). It also turns a 0-pin into a 1-pin (but not vice-versa). (As discussed above, the LSB of cxor, cx[0]^cx[0], is not actually needed but can be included for simplicity, or omitted, as desired.)

An n or n–1 bit mask value (as appropriate) is then generated from each XOR modified coordinate value by scanning each XOR modified coordinate value from its least significant bit to its most significant bit and setting the corresponding bit in the mask for each bit in the XOR modified coordinate value from the least significant bit to the most significant bit up to and including the first bit in the XOR-modified coordinate value that has a value of 1 (but any bits after the first bit in the XOR-modified coordinate value that has a value of 1 in the order LSB to MSB are not set in the mask value). In other words, for each coordinate cx, scan cxor from LSB to MSB to find the first bit enabled, with thermometer encoding output. (Thus for an XOR-modified coordinate value of 1100, for example, the resulting mask "scan" value will be 0111). Again, this can be done in any suitable and desired manner.

This results in an output "mask" value where all LSB bits are enabled up to (and including) the first enabled bit in the XOR modified coordinate value, cxor (but any bits after the first enabled bit in the XOR modified coordinate value, cxor (in the order LSB to MSB) are not enabled (set)).

This finds the position of the "pin", since the XOR operation above ensures that the bit-position of the "pin" will be the first bit position having a value of "1" when starting from the LSB of the XOR modified coordinate value.

This is a non-expensive type of scanner, with a critical path length proportional to log 2(C_WIDTH).

The so-generated mask values 712, 713 for each position coordinate are then further processed in an output value generating sub-circuit 714.

The sub-circuit 714 uses the mask values 712, 713, and the result of the bitwise comparison 705 of the bits of the position coordinates excluding the least significant bits, to provide an output value that can then be used in conjunction with the result of the least significant bit comparison 707 of the position coordinates to detect case b) above where the position coordinates differ from each other by exactly one and the number ending in 0 is larger.

FIG. 7 shows the operation of the sub-circuit 714 in this regard in more detail.

As shown in FIG. 7, for each bit position 800 in the mask values except the least significant bit of the position coordinates, the mask values 712, 713 are bitwise compared to determine whether the mask values for that bit position for the first and second texel group position coordinates are both set 801, are both not set 802, or only one of the mask values is set.

In the case where both the mask values for a bit position are set, then the output bit for that bit position in the output value is set 803 (to "1"). When only one of the mask values for the bit position is set, then the output bit for that bit position in the output value is not set 804 (i.e. left as "0").

When neither of the position coordinate masks 712, 713 is set for a bit position, then a comparison 805 of the actual position coordinate values for that bit position is also used, and when the bit values for the bit position in the position coordinates are the same, the output bit for that bit position in the output value is set 806, but not otherwise 807.

As shown in FIGS. 6 and 7, this latter process uses the result of the bitwise comparison 705 that is used to determine whether the position coordinates for the first and second texel groups excluding the least significant bits of the position coordinates are the same as each other. This enhances the efficiency of the process, as the result of the bitwise comparison for determining whether the position coordinates for the first and second texel groups excluding the least significant bits of the texel position coordinates are the same as each other can also be used for this mask value comparison and output value generation.

This output value generation using the mask values effectively calculates, for each bit position of the pair (ci, cj), an output value lij[bit] for that bit position:
lij[bit]=(maski[bit] && maskj[bit])||((!maski[bit] && !maskj[bit]) && (ci[bit]==cj[bit]));
(Note that Iji=Iij)
and effectively determines, firstly, whether the mask is set for both A and B (and therefore the bit position in question is part of the suffix/pin), or whether the mask is not set for the bit position for both A and B (and therefore the bit position in question is part of the prefix).

In the latter case, when the bit position is determined from the mask comparison to be part of the prefix (the mask is not set in both A and B), the output value for that bit position will only be set if the actual bit values in the position coordinates for that bit position are equal. This determines whether the prefixes are the same in A and B or not (for that bit position).

Thus, Iij[bit] will not be set if and only if:
Prefixes are a different size, or
Prefixes are the same size but their values are different.

Once the n−1 bit output value has been generated in this way (by considering the mask values for each bit position and, if necessary, the bit values for each bit position), it is then determined 808 whether all the bits of the output value for the pair of texel groups (and the position coordinate in question) have been set or not.

This is done as an And-reduction of the output value:
And-reduce Iij to ensure all bits of the pair (ci, cj) meet the condition:
rij=&Iij The sub-circuit 714 then provides an output (e.g. a single bit) indicative of whether all the bits in the so-generated output value for the pair of texel groups (for the position coordinate in question) have been set 809 or not 810.

If all the output value bits have been set, then the position coordinate A and B values will differ by one if and only if their LSBs are different 715,716 (this ensures suffixes/pin are opposite types).

Thus, all non-diagonal entries of the "difference-by-one" matrix B are effectively determined as:
Bij=eij && !ci[0] && cj[0]|| // Case a) All bits in ci and cj are equal except the last one. cj has the last bit set, and ci does not, hence ci=cj−1
rij && ci[0] && !cj[0]; // Case b) Prefix is the same size and same value, and suffixes/pin are different type, ci has a 1-suffix, hence ci=cj−1

The operation shown in FIGS. 6 and 7 discussed above will be repeated for each pair of texel groups and position coordinates to be considered, so as to generate appropriate entries to complete the "equality" Matrix A and "difference by one" Matrix B, accordingly.

Once the "equality" Matrix A and the "difference by one" Matrix B have been generated in this way, then the entries in those matrices can be used to determine (as discussed above), whether any of the texel groups in the set of texel groups being considered overlap (step 601 in FIG. 5), and that overlap determination used to then select texels of the texel groups to fetch, and so on.

In the present embodiments, the coordinates that are compared are those of the cache lines that the top left texels of the texel groups belong to. In addition to these coordinates, in the present embodiment, one bit per texel group and coordinate is used to indicate if the texel of the texel group span two cache lines in that coordinate, is used u_span and v_span. Each texel group has a u_span and v_span bit, and there are four cache line "distribution" cases for a group:

1. u_span=0, v_span=0→texel 0 belongs to line 0; texel 1 belongs to line 0; texel 2 belongs to line 0 and texel 3 belongs to line 0. Only one cacheline is used.
2. u_span=1, v_span=0→texel 0 belongs to line 0; texel 1 belongs to line 1; texel 2 belongs to line 0 and texel 3 belongs to line 1. Two cache lines are used, 0 and 1.
3. u_span=0, v_span=1→texel 0 belongs to line 0; texel 1 belongs to line 0; texel 2 belongs to line 2 and texel 3 belongs to line 2. Two cache lines are used, 0 and 2.
4. u_span=1, v_span=1→texel 0 belongs to line 0; texel 1 belongs to line 1; texel 2 belongs to line 2 and texel 3 belongs to line 3. Four cache lines are used, 0, 1, 2 and 3.

The cache line position coordinates and the cache line distribution (span) information for the texel groups are then used to identify, in effect, texel groups that have texels in the same cache lines (and to select the cache lines to fetch, accordingly).

For example, if texel 1 of group A and texel 2 of group B are determined to overlap, and texel 1 of group A uses line "1" used by group A, and texel 2 of group B uses line "2" used by group B (which depends on which of the cases above each group is), then line "1" of group A and line "2" of group B are the same cache line.

It is then checked which case above each group is in (based on the "span" indicators), in order to figure out which texels of the groups belong to those lines.

If that line is looked up in the cycle, then all the texels belonging to the line take advantage of that look up and are processed in that cycle.

For example:
When both groups have u_span=0 and v_span=0, only overlap of line 0 with line 0 is relevant, and that overlap means all 4 texels of both groups belong to the same cache line. If that cache line is looked up, all texels are done.
Overlaps with line 1 are only meaningful if the group is in cases 2 or 4. Otherwise it has no relevance.
Overlaps with line 2 are only meaningful if the group is in cases 3 or 4. Otherwise it has no relevance.
Overlaps with line 3 are only meaningful if the group is in case 4. Otherwise it has no relevance.
Two groups completely overlapping. If both groups are in case 4, it means both use 4 lines, and texels 0 use line 0, texels 1 use line 1, texels 2 use line 2 and texels 3 use line 3.
Two groups completely overlapping. If group B is case 1, then all its texels use line 0 from A, regardless of A's case (that is, it does not matter if group A uses 1, 2 or 4 cache lines).
Two groups completely overlapping. If group A is case 1, and group B is case 4, then only texel 0 from group B uses line 0 from A. Texels 1, 2 and 3 from B use different lines that are not used by group A.

An effect of this is that often a texel group will not be looked up in a single cycle. That is, the process might do a cache line lookup that includes texel 0, but there is no lookup that includes texel 1 of the group in that cycle.

Although the technology described herein has been described above with reference to the comparison of position coordinates for determining whether texel groups to be fetched for a graphics texture mapping process overlap or not, the Applicants have recognised that the process shown and described with particular reference to FIGS. 6 and 7 for determining whether two n-bit binary values are equal to each other or differ by exactly one may be useful in other circumstances where it is desirable to know whether two n-bit binary values are equal to each other or different from each other by exactly one. Thus further embodiments of the technology described herein use the process and circuits illustrated in FIGS. 6 and 7 to compare binary values that are not position coordinates, to determine whether those values are the same as each other or differ from each other by exactly one.

This could be useful, for example, where the binary values represent, e.g., and as discussed above, positions of graphics fragments (e.g. for a depth comparison process), or data values that it is desired to cluster.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system in which graphics textures may be used when rendering a render output and in which groups of texels of a texture to be used when rendering a render output are fetched from memory into a texel cache for use by the graphics processing system when rendering the render output;

the method comprising, when there are plural groups of texels to be fetched when rendering a render output, each group of texels having an associated set of position coordinates representative of the position of the group of texels in the texture, each position coordinate being represented by an n-bit binary number:

determining for one or more pairs of groups of texels of the groups of texels to be fetched, whether the groups of texels of the pair overlap with each other in the texture at all;

selecting texels of the groups of texels to fetch in a fetch cycle based on the overlap determination; and fetching the selected texels of the groups of texels in a fetch cycle;

wherein determining whether the groups of texels of a pair of groups of texels overlap with each other in the texture at all comprises:

determining for the pair of groups of texels, whether a position coordinate for a first texel group of the pair and the corresponding position coordinate for the second texel group of the pair are the same as each other or differ from each other by exactly one by:

determining whether the position coordinates for the first and second texel groups excluding the least significant bits of the position coordinates are the same as each other;

comparing the least significant bit of the position coordinate for the first texel group to the least significant bit of the position coordinate for the second texel group to determine whether: the least significant bits of the position coordinates for the first and second texel groups are the same as each other; the least significant bit of the position coordinate for the first texel group is greater than the least significant bit of the position coordinate for the second texel group; or the least significant bit of the position coordinate for the first texel group is less than the least significant bit of the position coordinate for the second texel group;

for each of the position coordinates for the first and second texel groups:

performing an XOR operation with the least significant bit of the coordinate at least for all of the bits except the least significant bit in the coordinate to provide an XOR-modified coordinate value; and generating a mask value from each XOR-modified coordinate value by scanning each XOR-modified coordinate value from its least significant bit to its most significant bit, and setting the corresponding bit in the mask for each bit in the XOR-modified coordinate value from the least significant bit to the most significant bit up to and including the first bit in the XOR-modified coordinate value that has a value of one;

for each bit position except the least significant bit of the position coordinates, using the corresponding mask values for the first and second texel group position coordinates for that bit position to set an output bit for that bit position in an (n−1)-bit output value for the pair of texel groups, comprising:

when the mask values for the bit position for the first and second texel group position coordinates are both set, setting the output bit for that bit position in the output value;

when only one of the mask values for the bit position for the first and second texel group position coordinates is set, not setting the output bit for that bit position in the output value; and when the mask values for the bit position for the first and second texel group position coordinates are both not set, also using a comparison of the bit values of the position coordinates for the first and second texel groups for that bit position, and when the bit values for that bit position in the position coordinates for the first and second texel groups are the same, setting the output bit for that bit position in the output value, but when the position coordinate values for the bit position are different, not setting the output bit for that bit position in the output value;

determining whether all the bits in the output value for the pair of texel groups have been set or not;

using:

the result of the determination of whether the position coordinates for the first and second texel groups excluding the least significant bits of the position coordinates are the same as each other;

the comparison of the least significant bit of the position coordinate for the first texel group to the least significant bit of the position coordinate of the second texel group; and the determination of whether all the bits in the output value generated using the mask values for the pair of texel groups have been set or not:

to determine whether the position coordinate for the first texel group of the pair of texel groups and the corresponding position coordinate for the second texel group of the pair of texel groups are the same as each other or differ from each other by exactly one;

and determining whether the first texel group of the pair and the second texel group of the pair overlap with each other in the texture at all using the determination of whether the position coordinate for the first texel group of the pair and the corresponding position coordinate for the second texel group of the pair are the same as each other or differ from each other by exactly one.

2. The method of claim 1, wherein the groups of texels each comprise a 2×2 group of neighbouring texels.

3. The method of claim 1, wherein the position coordinates for the texel groups of the pair for which it is determined whether the position coordinates are the same as each other or differ from each by exactly one comprise position coordinates representative of the position of corresponding texels in the texel groups that are being considered.

4. The method of claim 1, wherein the determination of whether the two position coordinates excluding the least significant bits of the position coordinates are the same as each other comprises:
performing a bitwise comparison for each bit position except the least significant bit of the position coordinates, followed by an AND-reduction of the result of the bitwise comparison, to provide an output indicative of whether the position coordinates excluding the least significant bits of the position coordinates are the same as each other or not.

5. The method of claim 4, comprising when using the corresponding mask values for the first and second texel group position coordinates for a bit position to set an output bit for the bit position in the (n−1)-bit output value for the pair of texel groups, and none of the masks is set for the bit position, using the result of the bitwise comparison performed for the bit position to determine whether the two position coordinates excluding the least significant bits of the position coordinates are the same as each other to determine whether the bit values for the bit position in the position coordinates for the first and second texel groups are the same or not.

6. The method of claim 1, comprising:
when it is determined that the position coordinates excluding their least significant bits are the same, and that the least significant bit of the position coordinate for the first texel group is the same as the least significant bit of the position coordinate for the second texel group, determining that the position coordinate of the first texel group is the same as the position coordinate for the second texel group;
when it is determined that the position coordinates excluding their least significant bits are the same, and that the least significant bit of the position coordinate for the first texel group is less than the least significant bit of the position coordinate for the second texel group, determining that the position coordinate for the first texel group is exactly one less than the position coordinate for the second texel group; and
when it is determined that the position coordinates excluding their least significant bits are the same, and that the least significant bit of the position coordinate for the first texel group is greater than the least significant bit of the position coordinate for the second texel group, determining that the position coordinate for the first texel group is exactly one greater than the position coordinate for the second texel group.

7. The method of claim 1, comprising:
when it is determined that all the bits in the output value generated using the mask values have been set, and that the least significant bit of the position coordinate for the first texel group is less than the least significant bit of the position coordinate for the second texel group, determining that the position coordinate for the first texel group is exactly one greater than the position coordinate for the second texel group; and
when it is determined that all the bits in the output value generated using the mask values have been set, and that the least significant bit of the position coordinate for the first texel group is greater than the least significant bit of the position coordinate for the second texel group, determining that the position coordinate for the first texel group is exactly one less than the position coordinate for the second texel group.

8. The method of claim 1, wherein each texel group has a pair of (n-bit) position coordinates associated with it, and the method comprises:
determining whether the position coordinates for the texel groups are the same as each other or differ from each other by exactly one separately for each respective position coordinate representative of the position of the texel groups; and
using the results of the respective position coordinate determinations together to determine whether the first and second texel groups overlap each other at all.

9. The method of claim 8, comprising:
determining that the texel groups overlap at least in part when it is determined that: both position coordinates for both texel groups are the same, or that one of the position coordinates is the same and the other position coordinates differ from each other by exactly one, or that both position coordinates differ from each other by exactly one.

10. The method of claim 1, comprising determining for each of plural pairs of groups of texels of the groups of texels to be fetched, whether the groups of texels of the pair overlap with each other in the texture at all.

11. A graphics processor, the graphics processor comprising:
a texture mapper circuit operable to perform graphics texture mapping operations;
a texel cache operable to store texels to be used for graphics texture mapping operations; and
a texel fetching circuit operable to fetch texels of a texture for use by the texture mapper to perform graphics texturing operations;
the graphics processor further comprising:
a texel group overlap determining circuit configured to, when there are plural groups of texels to be fetched for use by the texture mapper circuit to perform graphics texturing operations, each group of texels having an associated set of position coordinates representative of the position of the group of texels in the texture, each position coordinate being represented by an n-bit binary number:
determine for one or more pairs of groups of texels of the groups of texels to be fetched, whether the groups of texels of the pair overlap with each other in the texture at all; and
a texel selecting circuit configured to select texels of groups of texels to fetch in a fetch cycle based on the overlap determination, and to cause the texel fetching circuit to fetch the selected texels of the groups of texels in a fetch cycle;
wherein the texel group overlap determining circuit comprises a texel group position coordinate comparing circuit, configured to determine for a pair of groups of texels, whether a position coordinate for a first texel group of the pair and the corresponding position coordinate for the second texel group of the pair are the same as each other or differ from each other by exactly one, the texel group position coordinate comparing circuit comprising:
a coordinate comparing circuit configured to determine whether the position coordinates for the first and second texel groups excluding the least significant bits of the position coordinates are the same as each other and to provide an output indicating whether the position coordinates for the first and second texel groups excluding the least significant bits of the position coordinates are the same as each other;

a least significant bit comparison circuit configured to compare the least significant bit of the position coordinate for the first texel group to the least significant bit of the position coordinate for the second texel group and to provide an output indicating whether: the least significant bits of the position coordinates for the first and second texel groups are the same as each other; the least significant bit of the position coordinate for the first texel group is greater than the least significant bit of the position coordinate for the second texel group; or the least significant bit of the position coordinate for the first texel group is less than the least significant bit of the position coordinate for the second texel group;

a mask value generating circuit configured to, for each of the position coordinates for the first and second texel groups:
perform an XOR operation with the least significant bit of the coordinate at least for all of the bits except the least significant bit in the coordinate to provide an output XOR-modified coordinate value; and
generate as an output from each XOR-modified coordinate value a mask value by scanning each XOR-modified coordinate value from its least significant bit to its most significant bit, and setting the corresponding bit in the mask for each bit in the XOR-modified coordinate value from the least significant bit to the most significant bit up to and including the first bit in the XOR-modified coordinate value that has a value of one;

an output value generating circuit, configured to generate an (n–1)-bit output value for the pair of texel groups using the mask values generated by the mask value generating circuit by, for each bit position except the least significant bit of the position coordinates, using the corresponding mask values for the first and second texel group position coordinates for the bit position to determine whether to set an output bit for that bit position in an (n–1)-bit output value for the pair of texel groups, by:
when the mask values for the bit position for the first and second texel group position coordinates are both set, setting the output bit for that bit position in the output value;
when only one of the mask values for the bit position for the first and second texel group position coordinates is set, not setting the output bit for that bit position in the output value; and
when the mask values for the bit position for the first and second texel group position coordinates are both not set, also using a comparison of the bit values of the position coordinates for the first and second texel groups for that bit position, and when the bit values for that bit position in the position coordinates for the first and second texel groups are the same, setting the output bit for that bit position in the output value, but when the position coordinate values for the bit position are different, not setting the output bit for that bit position in the output value;

an output value assessment circuit configured to provide an output indicating whether all the bits in the output value generated for the pair of texel groups have been set or not;
and a position coordinate overlap determining circuit configured to use the output of the coordinate comparing circuit, the output of the least significant bit comparison circuit, and the output of the output value assessment circuit:
to determine whether the position coordinate for the first texel group of the pair of texel groups and the corresponding position coordinate for the second texel group of the pair of texel groups are the same as each other or differ from each other by exactly one, and to provide an output indicating whether the position coordinate for the first texel group of the pair of texel groups and the corresponding position coordinate for the second texel group of the pair of texel groups are the same as each other or differ from each other by exactly one;

and wherein
the texel group overlap determining circuit is configured to determine whether the first texel group of the pair and the second texel group of the pair overlap with each other in the texture at all using the output of the position coordinate overlap determining circuit.

12. The graphics processor of claim 11, wherein the groups of texels each comprise a 2×2 group of neighbouring texels.

13. The graphics processor of claim 11, wherein the position coordinates for the texel groups of the pair for which it is determined whether the position coordinates are the same as each other or differ from each by exactly one comprise position coordinates representative of the position of corresponding texels in the texel groups that are being considered.

14. The graphics processor of claim 11, wherein the coordinate comprising circuit comprises:
a bitwise comparison circuit configured to perform a bitwise comparison for each bit position except the least significant bit of the position coordinates; and
an AND-reduction circuit configured to perform an AND-reduction of the output of the bitwise comparison circuit, to provide an output indicative of whether the position coordinates excluding the least significant bits of the position coordinates are the same as each other or not.

15. The graphics processor of claim 14, wherein the output value generating circuit is configured to, when using the corresponding mask values for the first and second texel group position coordinates for a bit position to set an output bit for the bit position in the (n–1)-bit output value for the pair of texel groups, and none of the masks is set for the bit position, use the output of the bitwise comparison circuit to determine whether the bit values for the bit position in the position coordinates for the first and second texel groups are the same or not.

16. The graphics processor of claim 11, wherein:
the position coordinate overlap determining circuit is configured to:
determine that the position coordinate of the first texel group is the same as the position coordinate for the second texel group, when it is determined that the position coordinates excluding their least significant bits are the same, and that the least significant bit of the position coordinate for the first texel group is the same as the least significant bit of the position coordinate for the second texel group;
determine that the position coordinate for the first texel group is exactly one less than the position coordinate for the second texel group, when it is determined that the position coordinates excluding their least significant bits are the same, and that the least significant bit of the position coordinate for the first texel group is less than the least significant bit of the position coordinate for the second texel group; and determine that the position coordinate for the first texel group is exactly one greater than the position coordinate for the second texel group, when it is determined that the position coordinates excluding their least significant bits are the same, and that the least significant bit of the position coordinate for the first texel group is greater than the least significant bit of the position coordinate for the second texel group.

17. The graphics processor of claim 11, wherein:
the position coordinate overlap determining circuit is configured to:
determine that the position coordinate for the first texel group is exactly one greater than the position coordinate for the second texel group, when it is determined that all the bits in the output value generated using the mask values have been set, and that the least significant bit of the position coordinate for the first texel group is less than the least significant bit of the position coordinate for the second texel group; and
determine that the position coordinate for the first texel group is exactly one less than the position coordinate for the second texel group, when it is determined that all the bits in the output value generated using the mask values have been set, and that the least significant bit of the position coordinate for the first texel group is greater than the least significant bit of the position coordinate for the second texel group.

18. The graphics processor of claim 11, wherein each texel group has a pair of (n-bit) position coordinates associated with it, and the texel group overlap determining circuit is configured to:
determine whether the position coordinates for the texel groups are the same as each other or differ from each other by exactly one separately for each respective position coordinate representative of the position of the texel groups; and
use the results of the respective position coordinate determinations together to determine whether the first and second texel groups overlap each other at all.

19. The graphics processor of claim 18, wherein the texel group overlap determining circuit is configured to:
determine that the texel groups overlap at least in part when it is determined that: both position coordinates for both texel groups are the same, or that one of the position coordinates is the same and the other position coordinates differ from each other by exactly one, or that both position coordinates differ from each other by exactly one.

20. The graphics processor of claim 11, wherein the texel group overlap determining circuit is configured to determine for each of plural pairs of groups of texels of the groups of texels to be fetched, whether the groups of texels of the pair overlap with each other in the texture at all.

21. An apparatus for determining whether a first n-bit binary data value and a second n-bit binary data value in a data processing system are the same as each other or differ from each other by exactly one, the apparatus comprising:
a data value comparing circuit configured to determine whether a first n-bit binary data value and a second n-bit binary data value excluding the least significant bits of the data values are the same as each other, and to provide an output indicating whether the first n-bit binary data value and the second n-bit binary data value excluding the least significant bits of the data values are the same as each other;

a least significant bit comparison circuit configured to compare the least significant bit of the first data value to the least significant bit of the second data value and to provide an output indicating whether: the least significant bits of the data values are the same as each other; the least significant bit of the first data value is greater than the least significant bit of the second data value; or the least significant bit of the first data value is less than the least significant bit of the second data value;

a mask value generating circuit configured to, for each of the first and second data values:
perform an XOR operation with the least significant bit of the data value at least for all of the bits except the least significant bit in the data value to provide an XOR-modified data value; and
generate as an output from each XOR-modified data value a mask value by scanning each XOR-modified data value from its least significant bit to its most significant bit, and setting the corresponding bit in the mask for each bit in the XOR-modified data value from the least significant bit to the most significant bit up to and including the first bit in the XOR-modified data value that has a value of one;

an output value generating circuit, configured to generate an (n−1)-bit output value for the pair of data values using the mask values generated by the mask value generating circuit by:
for each bit position except the least significant bit of the data values, using the corresponding mask values for the first and second data values for that bit position to set an output bit for that bit position in an (n−1)-bit output value for the two data values, comprising:
when the mask values for the bit position for the first and second data values are both set, setting the output bit for that bit position in the output value;
when only one of the mask values for the bit position for the first and second data values is set, not setting the output bit for that bit position in the output value; and
when the mask values for the bit position for the first and second data values are both not set, also using a comparison of the bit values of the first and second data values for that bit position, and when the bit values for that bit position in the first and second data values are the same, setting the output bit for that bit position in the output value, but when the position coordinate values for the bit position are different, not setting the output bit for that bit position in the output value;

an output value assessment circuit configured to provide an output indicating whether all the bits in the output value for the two data values have been set or not; and a data value equality and difference determining circuit configured to use the output of the data value comparing circuit, the output of the least significant bit comparison circuit, and the output of the output value assessment circuit:
to determine whether the first data value and the second data value are the same as each other or differ from each other by exactly one.

22. A non-transitory computer readable storage medium storing computer software code that when executed on a processor performs a method of determining whether a first n-bit binary data value and a second n-bit binary data value in a data processing system are the same as each other or differ from each other by exactly one, the method comprising:

determining whether the first and second data values excluding the least significant bits of the data values are the same as each other;

comparing the least significant bit of the first data value to the least significant bit of the second data value to determine whether: the least significant bits of the data values are the same as each other; the least significant bit of the first data value is greater than the least significant bit of the second data value; or the least significant bit of the first data value is less than the least significant bit of the second data value;

for each of the first and second data values:
performing an XOR operation with the least significant bit of the data value at least for all of the bits except the least significant bit in the data value to provide an XOR-modified data value; and
generating a mask value from each XOR-modified data value by scanning each XOR-modified data value from its least significant bit to its most significant bit, and setting the corresponding bit in the mask for each bit in the XOR-modified data value from the least significant bit to the most significant bit up to and including the first bit in the XOR-modified data value that has a value of one;

for each bit position except the least significant bit of the data values, using the corresponding mask values for the first and second data values for that bit position to set an output bit for that bit position in an (n−1)-bit output value for the two data values, comprising:

when the mask values for the bit position for the first and second data values are both set, setting the output bit for that bit position in the output value;

when only one of the mask values for the bit position for the first and second data values is set, not setting the output bit for that bit position in the output value; and when the mask values for the bit position for the first and second data values are both not set, also using a comparison of the bit values of the first and second data values for that bit position, and when the bit values for that bit position in the first and second data values are the same, setting the output bit for that bit position in the output value, but when the position coordinate values for the bit position are different, not setting the output bit for that bit position in the output value;

determining whether all the bits in the output value for the two data values have been set or not;

using:
the result of the determination of whether the position coordinates for the first and second data values excluding the least significant bits of the data values are the same as each other;
the comparison of the least significant bit of the first data value to the least significant bit of the second data value; and
the determination of whether all the bits in the output value generated using the mask values for the two data values have been set or not:
to determine whether the first data value and the second data value are the same as each other or differ from each other by exactly one.

* * * * *